United States Patent
Lemay et al.

(10) Patent No.: US 12,487,822 B2
(45) Date of Patent: Dec. 2, 2025

(54) APPARATUS, COMPUTER-READABLE MEDIUM, AND METHOD FOR REDUCING BOUNDS CHECKING OVERHEAD BY INSTRUMENTING POINTER ARITHMETIC

(71) Applicant: Intel Corporation, Santa Clara, CA (US)

(72) Inventors: Michael Lemay, Beaverton, OR (US); David M. Durham, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 794 days.

(21) Appl. No.: 17/485,347

(22) Filed: Sep. 25, 2021

(65) Prior Publication Data
US 2022/0012055 A1    Jan. 13, 2022

(51) Int. Cl.
*G06F 9/30*       (2018.01)
*G06F 12/14*      (2006.01)

(52) U.S. Cl.
CPC ........ *G06F 9/3004* (2013.01); *G06F 9/30145* (2013.01); *G06F 12/14* (2013.01)

(58) Field of Classification Search
None
See application file for complete search history.

(56) References Cited

U.S. PATENT DOCUMENTS

| | | | | |
|---|---|---|---|---|
| 8,635,415 B2* | 1/2014 | Patel | ........... | G06F 9/342 712/225 |
| 10,838,878 B2* | 11/2020 | Barnes | ........... | G06F 21/64 |
| 11,200,158 B1* | 12/2021 | Lie | ........... | G06F 16/90335 |
| 11,429,590 B2* | 8/2022 | Boivie | ........... | G06F 12/023 |
| 11,625,171 B2* | 4/2023 | Boivie | ........... | G06F 3/0679 711/154 |
| 11,784,786 B2* | 10/2023 | Deutsch | ........... | H04L 9/3242 711/163 |
| 12,182,317 B2* | 12/2024 | LeMay | ........... | G06F 12/0871 |
| 2011/0078389 A1* | 3/2011 | Patel | ........... | G06F 9/30105 712/225 |

(Continued)

FOREIGN PATENT DOCUMENTS

EP        3757853 B1 * 12/2022     ......... G06F 12/0284

OTHER PUBLICATIONS

'Baggy Bounds Checking: An Efficient and Backwards-Compatible Defense against Out-of-Bounds Errors' by Akriditis et al., 18th USENIX Security Symposium, 2009. (Year: 2009).*

(Continued)

*Primary Examiner* — Steven G Snyder
(74) *Attorney, Agent, or Firm* — Hanley, Flight & Zimmerman, LLC

(57) ABSTRACT

Methods, apparatus, systems, and articles of manufacture are disclosed that perform bounds checking on authorized memory allocations during pointer arithmetic. In some examples, instruction decode circuitry decodes an update pointer instruction for a pointer. In some examples, bounds checking circuitry determines an authorized allocation for the pointer, determines one or more exclusion zones and poison zones for the pointer. In some examples, bounds checking circuitry updates the pointer and generates a fault if the pointer points to one of the exclusion zones and poisons the pointer if the pointer points to one of the poison zones.

20 Claims, 11 Drawing Sheets

(56) References Cited

U.S. PATENT DOCUMENTS

| | | | | |
|---|---|---|---|---|
| 2011/0320758 | A1* | 12/2011 | Craddock | G06F 12/10 |
| | | | | 711/206 |
| 2012/0278665 | A1 | 11/2012 | Serebryany et al. | |
| 2020/0379902 | A1 | 12/2020 | Durham et al. | |
| 2021/0240638 | A1* | 8/2021 | Deutsch | G06F 12/1408 |
| 2021/0374047 | A1* | 12/2021 | Lie | G06F 16/90335 |
| 2022/0261509 | A1* | 8/2022 | LeMay | G06F 12/0871 |
| 2023/0078428 | A1* | 3/2023 | Boivie | G06F 3/0679 |
| | | | | 711/154 |

OTHER PUBLICATIONS

Machine Translation of Korean Patent Application KR 20170103200, published Sep. 13, 2017. (Year: 2017).*

Younan, Y., et al., "PAriCheck: An Efficient Pointer Arithmetic Checker for C Programs," In Proceedings of the 5th ACM Symposium on Information, Computer and Communications Security (ASIACCS '10), Apr. 13, 2010. Association for Computing Machinery, New York, NY, USA, pp. 145-156. Retrieved from http://www.fort-knox.org/files/paricheck.pdf?ref=cisco-talos-blog, 12 pages.

Burow, N., et al., "CUP: Comprehensive User-Space Protection for C/C++," In Proceedings of the 2018 on Asia Conference on Computer and Communications Security (ASIACCS '18), May 29, 2018. Association for Computing Machinery, New York, NY, USA, pp. 381-392. Retrieved from https://arxiv.org/abs/1704.05004, 14 pages.

Juneyoung, L., et al., "Reconciling high-level optimizations and low-level code in LLVM," Proceedings of the ACM on Programming Languages vol. 2 Issue OOPSLA, Article No. 125, Oct. 24, 2018, pp. 1-28. Retrieved from https://dl.acm.org/doi/10.1145/3276495, 28 pages.

Serebryany, K., et al., "AddressSanitizer: a fast address sanity checker," USENIX ATC'12: Proceedings of the 2012 USENIX conference on Annual Technical Conference, Jun. 13, 2012, pp. 309-318. Retrieved from https://www.usenix.org/system/files/conference/atc12/atc12-final39.pdf, 10 pages.

Xu, S., et al., "In-Fat Pointer: Hardware-Assisted Tagged-Pointer Spatial Memory Safety Defense with Subobject Granularity Protection," ASPLOS '21: Proceedings of the 26th ACM International Conference on Architectural Support for Programming Languages and Operating Systems, Apr. 17, 2021, pp. 224-240. Retrieved from https://security.csl.toronto.edu/wp-content/uploads/2021/03/xu-ifp-asplos2021.pdf, 17 pages.

European Patent Office, "Extended European Search Report," issued in connection with European Patent Application No. 22192033.3, dated Feb. 21, 2023, 20 pages.

European Patent Office, "Communication under Rule 71(3) EPC," issued in connection with European Patent Application No. 22192033.3, dated Mar. 20, 2023, 70 pages.

* cited by examiner

APPARATUS, COMPUTER-READABLE MEDIUM, AND METHOD FOR REDUCING BOUNDS CHECKING OVERHEAD BY INSTRUMENTING POINTER ARITHMETIC

FIELD OF THE DISCLOSURE

This disclosure relates generally to memory bounds checking and, more particularly, to memory bounds checking during pointer arithmetic.

BACKGROUND

Bounds checks have become foundational to safe programming languages (e.g., Python, JavaScript, Java, Go, Rust, etc.) in recent years. Additionally, they are increasingly being applied to unsafe languages (e.g., C/C++). Bounds checks are also utilized to mitigate prevalent vulnerabilities involving out-of-bounds accesses such as buffer overflows. Instruction Set Architectures (ISAs) are also being extended with bounds checking support. Examples of this are CHERI (Capability Hardware Enhanced Reduced Instruction Set Computer (RISC) Instructions) in ARM and RISC-V, the ARM Memory Tagging Extension (MTE), and Intel Memory Tagging Technology (MTT).

Figure 1:
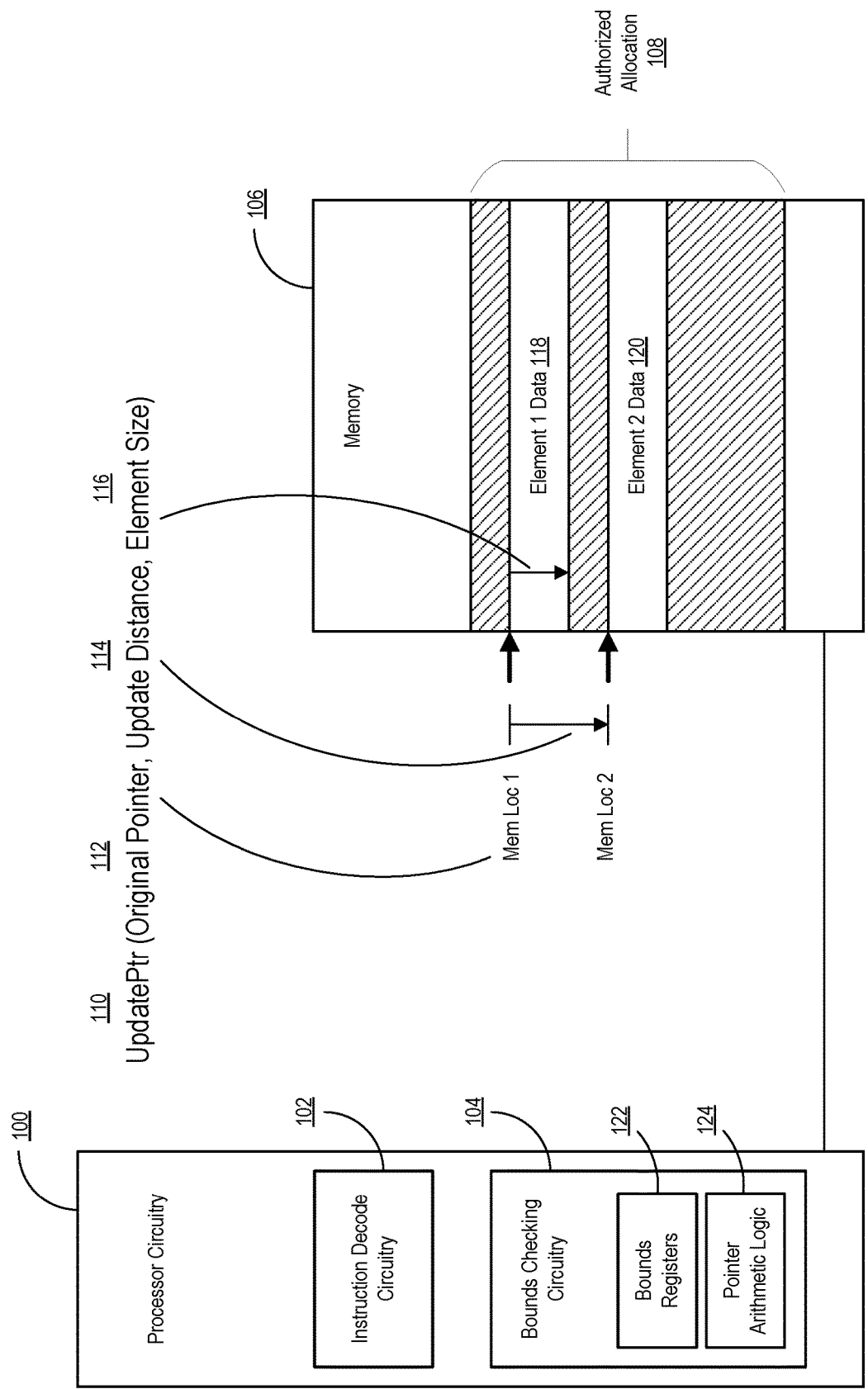
FIG. 1 is a schematic illustration of example circuitry to reduce bounds checking overhead of authorized memory allocations by implementing pointer arithmetic.

The figures are not to scale. Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein "substantially real time" refers to occurrence in a near instantaneous manner recognizing there may be real world delays for computing time, transmission, etc. Thus, unless otherwise specified, "substantially real time" refers to real time+/−1 second. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Authorized memory allocations using memory safety techniques are quite common across a number of programming languages. With memory-safe languages, access to authorized memory allocations using pointers are checked to make sure they do not drift outside of the range authorized to be accessed. If an unauthorized access is performed, the operating system will generate a fault. When pointers to the memory allocations are utilized frequently, this introduces overhead each time a pointer to the allocation is dereferenced because the system has to check if the dereference is authorized.

Memory bounds checking refers to determining whether a memory location to be accessed is within an allocated bounds (i.e., a particular range of addresses) in memory. There are four main approaches for memory bounds checking:

1) Storing precise bounds, e.g. in a metadata table or in an expanded pointer, and checking addresses to be accessed against those bounds.
2) Storing tags and checking that a tag in a pointer matches the tag associated with every granule of memory to be accessed.
3) Defining a bitmap indicating whether a valid allocation occupies each granule of memory without requiring a tag value to be stored in pointers.
4) Grouping similarly-sized allocations into contiguous regions of identically-sized slots to derive bounds implicitly based on allocation location.

What these approaches all have in common is that they perform bounds checks each time a pointer is dereferenced. However, pointer dereferences/memory accesses are frequent operations, so performing a bounds check associated with each of those operations introduces substantial overhead. Furthermore, checking bounds only prior to dereferences reduces coverage for vulnerabilities because many bounds checking mechanisms can miss non-adjacent overflows that skip far past the ends of buffers.

Pointer arithmetic is typically much less frequent than pointer dereferences. Checking pointer arithmetic prevents pointers from escaping the bounds of an object in a way that would otherwise lead to non-adjacent overflows.

In some examples, a three-pronged approach to checking the bounds of an authorized memory allocation during pointer arithmetic is utilized to increase bounds checking efficiency and accuracy. In some examples, the three prongs are as follows:

1) Generate a fault/exception if a pointer strays too far beyond the allocation bounds.
2) Poison a pointer if it is positioned too close to the end of an allocation such that all or a portion of an access via dereferencing the pointer would be out-of-bounds.
3) Generate a fault/exception if a poisoned pointer is dereferenced.

FIG. 1 is a schematic illustration of example processor circuitry 100 to instrument bounds checking of authorized memory allocations during pointer arithmetic. In the illustrated example, the processor circuitry 100 includes instruction decode circuitry 102 and bounds checking circuitry 104. Additional details of a computer system that includes the processor circuitry 100 is also described below as processor circuitry 912 in the discussion of FIG. 9.

In different examples, the processor circuitry 100 is a general purpose central processor unit (CPU), a graphics processor unit (GPU), a field programmable gate array (FPGA), or other type of processor. In the illustrated example shown in FIG. 1, the processor circuitry 100 includes instruction decode circuitry 102 that decodes instructions to be executed. Instructions may be received by the instruction decode circuitry 102 through any process used to decode instructions, e.g., an instruction pipeline with a set of instructions in a queue/buffer.

In the illustrated example in FIG. 1, a memory 106 is in circuit with the processor circuitry 100 to store information (e.g., data). The example memory 106 may be any type of memory that has the capability of storing data. Some examples of memory include dynamic random access memory (DRAM), static random access memory (SRAM), flash memory, special purpose buffers and registers, or any other form of known memory that can interact with processor circuitry 100. The example memory 106 may be volatile or non-volatile and can be any suitable size. As illustrated in the example in FIG. 1, the memory 106 may be discrete from the processor circuitry 100. In other examples, the memory 106 may be integrated into processor circuitry 100, such as a cache or other type of local memory that may be co-located in the same semiconductor package as the processor circuitry 100 or fabricated on the same semiconductor die as the processor circuitry 100.

In some examples, the processor circuitry 100 (e.g., the bounds checking circuitry 104) allocates slots (e.g., segments, sections) of the memory 106 for use. In some examples, other circuitry within the processor circuitry 100 or elsewhere allocate slots of the memory 106 through an authorized safety process, a memory allocator or a software library. In some examples, an authorized allocation 108 is associated with one or more slots of memory. In examples disclosed herein, a slot of memory is an amount of memory defined using one of several methods. For example, a slot of memory may be an amount (e.g., size) of memory that is defined by a power of two Bytes (e.g., a 256-Byte slot of memory or a $2^8$ Byte slot of memory). In other examples, a slot of memory may be defined as a page of memory (e.g., 4 KBytes of memory) or it may be defined as a portion of a page of memory or it may span multiple pages of memory. In other examples, a slot of memory may be any size of memory that has been defined or can be defined through an allocation process.

There are multiple ways to allocate memory slots. The particular allocation method may be selected based on a number of different memory management factors. In some examples, an authorized allocation (e.g., the authorized allocation 108) is created using bounds defined based on a starting address and a size that bounds an authorized lower limit (e.g., the starting address of the allocation) and an authorized upper limit (e.g., the starting address of the sllocation+the size of the allocation). In some examples, the authorized allocation 108 adheres to one or more memory safety policies. The bounds of the authorized allocation 108 can be determined by a manner applicable to the underlying memory safety policy/policies. Examples of determining the bounds of the authorized allocation 108 include:

A. Loading the bounds from Linear Inline Metadata (LEVI).
B. Retrieving the bounds from a pointer, e.g. in a CHERI fat pointer capability mechanism.
C. Loading the bounds from a structure defined by a programming language runtime (e.g., a JavaScript object reference).
D. Scanning a tag table to find the boundary where a different tag is defined than was referenced by the original pointer, e.g. as in ARM MTE.
E. Looking up the uniform memory slot size being used for the referenced memory region and rematerializing the bounds for the referenced allocation based on a starting point/address for the current region.
F. Scanning a memory allocation bitmap table indicating valid, allocated slots (e.g., granules) of the memory, where each slot allocated has a bit set and each slot not allocated has a bit cleared.
G. Scanning a memory allocation bitmap indicating boundaries between allocations that are aligned to superpage boundaries.

In Example G above, some allocation methods align large allocations to memory superpage boundaries. For example, the Google Chrome® browser "PartitionAlloc" instruction aligns all allocations larger than 960 kibibytes (KiBytes) to 2 mebibyte (MiByte) boundaries. In some examples, all 2

MiByte allocations are placed into a defined and well-known region of memory. Thus, bounds within that region can be determined by maintaining one bit of information for every 2 MiByte superpage indicating whether that superpage is either the last superpage within an allocation or an interior superpage. An interior superpage is not at the beginning of the allocation and not empty/unallocated. If either of those properties is true of the page, then the corresponding bit within the bitmap is cleared. Otherwise, the bit is set, which indicates that the corresponding superpage is either the first superpage in an allocation or is unallocated.

In a bitmap allocation example, from any pointer pointing to a location within the allocation, the bounds of the entire allocation can be computed by scanning forward and/or backward within the bitmap starting at the location corresponding to the pointer and watching for a set bit. In some examples, when scanning forward, the first set bit indicates the end of the allocation. In some examples, when scanning backward, the first set bit indicates the beginning of the allocation.

In the illustrated example of FIG. 1, an instruction (e.g., an UpdatePtr instruction 110) to update the location of a pointer is received and/or otherwise retrieved by the instruction decode circuitry 102. In some examples, the pointer points to an address location in the authorized allocation 108. In some examples, the UpdatePtr instruction 110 performs one or more bounds checks during pointer arithmetic while the pointer is updated from a first address to a second address. In the illustrated example of FIG. 1, the first address (Mem Loc 1) is the original address of the pointer prior to the UpdatePtr instruction 110 being executed. The second address (Mem Loc 2) in the illustrated example of FIG. 1 is the updated address of the pointer after the UpdatePtr instruction 110 has been executed.

In some examples, the UpdatePtr instruction 110 is defined as follows:
Instruction: UpdatePtr (110 in FIG. 1)
Operand 1: Original Pointer (112 in FIG. 1)—original address value of the pointer
Operand 2: Update Distance (114 in FIG. 1)—distance to move pointer (e.g., current pointer address+distance=new pointer address)
Operand 3: Element Size (116 in FIG. 1)—size of an element of data to be stored in the allocated space (e.g., at the new pointer address)

In some examples, the original pointer operand 112 points to a location of the beginning of an element to be stored in the memory 106. In the illustrated example of FIG. 1, the address in the original pointer operand 112 points at the Mem Loc 1 location in the authorized allocation 108.

In some examples, the element is an amount of data of a certain type (e.g., element 1 data 118). The data type can be any valid data type in different examples. For example, element 1 data 118 can be of a 32-bit floating point data type (FP32). In other examples, the data type can be a 64-bit floating point data type (FP64), one of several integer data types such as 8-bit, 16-bit, or 32-bit integer data types, or any other known data type that can be stored in the memory 106. Using the first example data type for explanatory purposes, the element 1 data 118 may be a FP32 data type that is a 4-Byte value, thus element 1 data 118 has a 4-Byte size, which would be reflected in the element size operand 116.

In some examples, elements are stored in non-adjacent memory locations within the authorized allocation 108. Thus, there may be one or more bits or bytes of memory space between the stored data elements. For example, the update distance operand 114 may be eight bytes while the element size operand 116 is four bytes. This would indicate that each element stored in memory is four bytes in size, but there are eight bytes in address space between the start of each element (e.g., the memory address delta between Mem Loc 1 and Mem Loc 2). Thus, element 1 data 118 would be stored in the first four bytes of space starting at Mem Loc 1. Then there would be four bytes of memory space after the end of element 1 data 118 that would not be utilized prior to the start address of Mem Loc 2 where element 2 data 120 would be stored across the next four bytes. In other examples, elements are stored in adjacent memory locations. In these examples, the update distance operand 114 and the element size operand 116 may have the same value. For example, 4-byte element size 116 and 4-byte update distance 114 means every four bytes of memory address space in the authorized allocation 108 would store a 4-byte element.

A number of different data storage systems have open spaces (e.g., redzones) between the elements and/or between the allocations to allow for the storage of metadata (e.g., tags) either in front of or behind the actual element data. The redzones can be expanded or contracted based on metadata requirements (e.g., the number of tags, the size of the tags, etc.).

In some examples, after instruction decode circuitry 102 decodes the UpdatePtr instruction 110, then the bounds checking circuitry 104 performs the pointer arithmetic, while in other examples the example instruction decode circuitry 102 performs such updates, but other structure may accomplish these objectives, without limitation. For example, bounds checking circuitry 104 receives the original pointer address and then calculates the memory space attempting to be utilized if the UpdatePtr instruction 110 is successful. Specifically, the example bounds checking circuitry 104 adds the update distance operand 114 to the original pointer operand 112 (Mem Loc 1) to find the beginning memory location of element 2 data 120 (Mem Loc 2) and then adds the element size operand 116 to Mem Loc 2 to find the new bounds.

In some examples, the bounds checking circuitry 104 includes one or more bounds registers 122 to store pointer address, size, and distance data, among other information, during pointer arithmetic. In some examples, the bounds checking circuitry 104 includes pointer arithmetic logic 124 that performs the pointer arithmetic described below.

Figure 2:
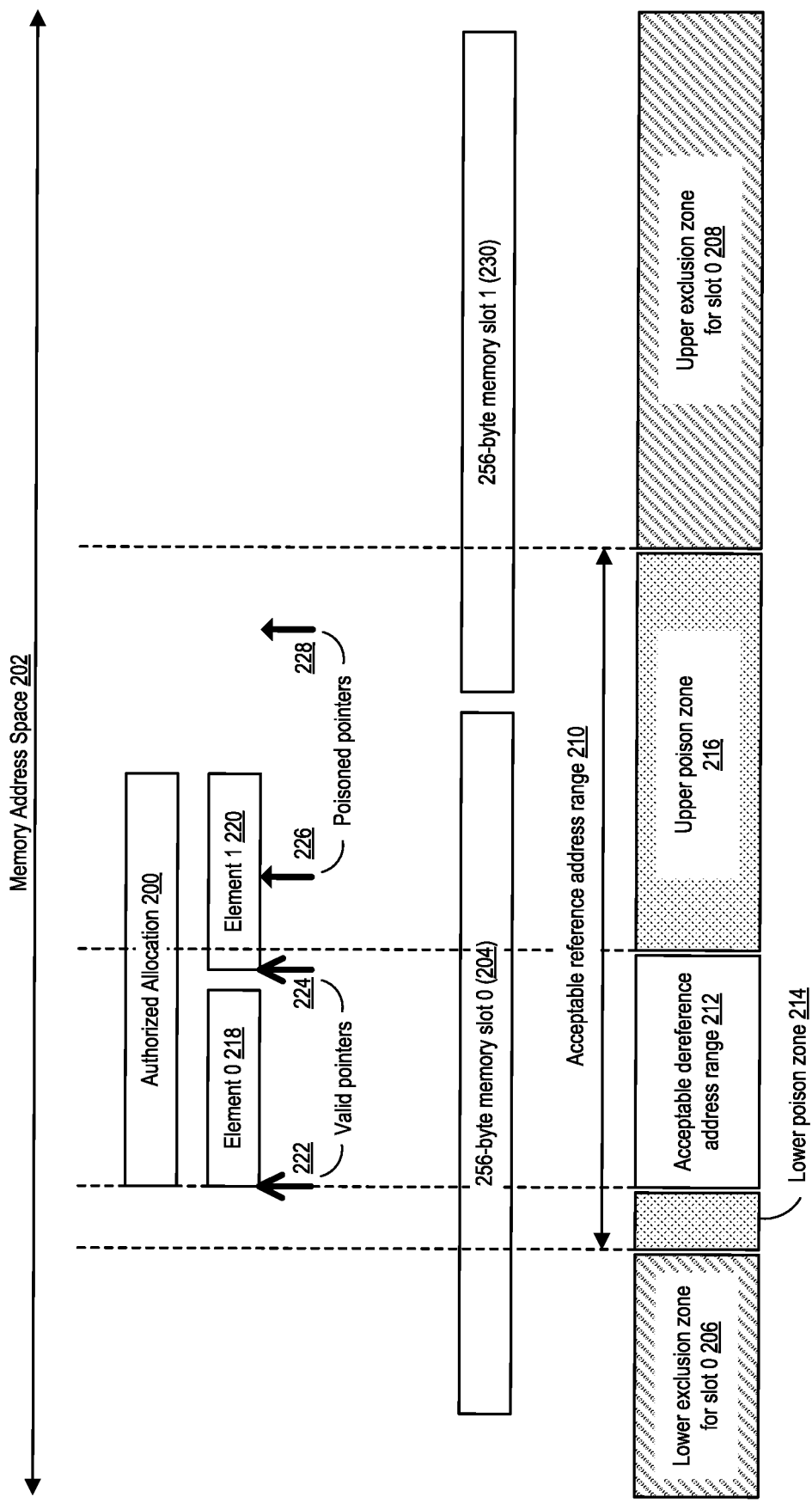
FIG. 2 is an illustrative example of memory address space utilized when implementing pointer arithmetic for bounds checking.

FIG. 2 is an illustrative example of memory address space 202 to implement pointer arithmetic for bounds checking in accordance with teachings of this disclosure. In the illustrated example of FIG. 2, an authorized allocation 200 has been allocated in the memory address space 202. In some examples, the authorized allocation 200 is located in an allocated 256-byte memory slot 0 (204). In some examples, there are three types of defined zones of address locations/ranges associated with the authorized allocation 200 in memory slot 0 (204), including the following:

1) An authorized zone address range (or set of ranges): A range of addresses that a pointer associated with the authorized allocation 200 is allowed to both reference (e.g., point at the address) and also be dereferenced while pointing at an address in that range (e.g., access the value/data stored in the memory location pointed to by the pointer).
2) A poison zone address range (or set of ranges): A range of addresses that a pointer associated with the authorized allocation 200 is allowed to reference but the pointer is not allowed to be dereferenced while pointing at an address in that range. For example, a set of poison zone memory locations associated with the authorized allocation.

3) An exclusion zone address range (or set of ranges): A range of addresses that a pointer associated with the authorized allocation 200 is not allowed to reference or be dereferenced while pointing at an address in that range. For example, a set of exclusion zone memory locations associated with the authorized allocation.

As shown in the illustrated example of FIG. 2, at least one exclusion zone is associated with memory slot 0 (204). Specifically, example memory slot 0 (204) has an associated lower exclusion zone 206 and upper exclusion zone 208. In some examples, memory address space 202 has a bounded acceptable reference address range of memory 210 for use by pointers pointing to memory locations within memory slot 0 (204). In some examples, the exclusion zones exist outside of the acceptable reference address range 210 (both above and below the range). In some examples, if the UpdatePtr instruction results (through pointer arithmetic) in a pointer address referencing one or more locations corresponding to either of the exclusion zones shown in FIG. 2, then the example bounds checking circuitry (104 in FIG. 1) generates an exception (e.g., a memory fault).

When referring to memory addresses, the term "above" a given address refers to addresses that are greater than the given address in linear address space (e.g., address 0x00010000 is above address 0x0000FF00). The term "below" a given address refers to addresses that are less than the given address in linear address space (e.g., address 0x0001EE00 is below address 0x02000000).

In some examples, the acceptable reference address range 210 is a contiguous range of memory addresses in memory address space 202, as shown in the example in FIG. 2. In other examples, a non-contiguous range of memory addresses is allocated, which would include multiple acceptable reference address ranges and potentially more than two exclusion zones. In some examples, the acceptable range of memory address space is at the top or the bottom of memory address space 202, thus a single exclusion zone may be utilized.

In some examples, the acceptable reference address range 210 for a pointer referencing the authorized allocation 200 may vary and dynamically change based on several factors. For example, factors that can change the acceptable reference address range 210 (and as a result change the address ranges of the exclusion zones) include a size of an allocated memory slot, a size of the authorized allocation, a size of an element, a distance between each element (e.g., to help facilitate "tripwires" or "canaries" to detect overflows between elements), and an element data type, among other factors.

In the illustrated example in FIG. 2, within the acceptable reference address range 210 are both an acceptable dereference address range 212 and two poison zone address ranges (lower poison zone 214 and upper poison zone 216). In some examples, the acceptable dereference address range 212 is a range of addresses associated with the authorized allocation 200 where a pointer is allowed to both reference and also be dereferenced. As mentioned above, a pointer is allowed to reference an address in the poison zone address ranges but is not allowed to be dereferenced.

As illustrated in the example memory address space 202 in FIG. 2, the authorized allocation 200 is not the same address range/size as the memory slot 0 (204) or the acceptable reference address range 210. In some examples, code might increment a pointer through an array of data and either the initial reference value of the pointer is prior to a first memory address location of a first element in the array or the final reference value of the pointer is after a last memory address location of a last element in the array. Based on how the code is written, it is sometimes acceptable to allow a pointer reference address to be set to an address location outside of the authorized allocation 200 as long as the pointer is not dereferenced at that address. Additionally, for the same reasons, it is sometimes acceptable to allow a pointer reference address to be set to an address outside of the range of addresses of the allocated memory slot (e.g., memory slot 0 (204)), again, as long as the pointer is not dereferenced at that address.

Thus, in some examples, there is no need to generate an exception for simply setting the pointer address outside of the authorized allocation 200. In these scenarios, there exists one or more poison zone address ranges outside of the authorized allocation 200 that a pointer address can be set to as long as a dereference does not occur.

Additionally, in some examples, a certain range of addresses exist within the authorized allocation 200 that also are a portion of a poison zone. These addresses are in the poison zone due to the size of an element accessed. For example, element 0 (218) and element 1 (220) may be 4-byte FP32 data elements. Thus, if a pointer is updated to an address two bytes from the end of the authorized allocation 200, the pointer is referencing an element that is stored partially outside of the authorized allocation 200 (the last two bytes of the element data are stored outside of the authorized allocation 200 in this example). Thus, in some examples, the acceptable dereference address range 212 will have an upper bound at the final memory address location capable of storing a full element of data within the authorized allocation 200 starting at that upper bound address. In some examples, the upper poison zone 216 begins at the next byte beyond the end of the upper bound of the acceptable dereference address range 212.

In the illustrated example in FIG. 2, valid pointers (222 and 224) are shown at the beginning of element 0 (218) and element 1 (220), respectively. These pointers are valid because at those addresses entire elements of data are able to be stored in the authorized allocation 200. Example first poisoned pointer 226 and example second poisoned pointer 228 are at memory addresses that cannot fit entire elements inside the authorized allocation 200 starting at such pointer addresses. As illustrated in FIG. 2, the example first poisoned pointer 226 exists in a location that, while within authorized allocation 200, an entire element of data would not fit within the authorized allocation 200 if the element were stored starting at the example first poisoned pointer 226 memory address. The example second poisoned pointer 228 exists in a location that is outside both the authorized allocation 200 as well as outside the allocated memory slot 0 (204). But, in the example shown, the example second poisoned pointer 228 is poisoned instead of immediately causing a fault to be generated because although it falls within the address range of the next 256-byte memory slot 1 (230), there may be a defined legitimate code practice that allows the pointer reference address to stray that far outside of the authorized allocation 200, as long as the pointer is not dereferenced at that location.

In some examples, each pointer includes a poison bit. In some examples, the bounds checking circuitry (104 in FIG. 1) sets the poison bit for the pointer when the pointer address is updated and falls within a poison zone. Then if a dereference subsequently happens, the bounds checking circuitry and/or separate circuitry capable of address canonicality checking will see the pointer is poisoned (i.e., the poison bit has been set) and will then generate an exception (e.g., a memory fault).

In some examples, the poison bit for a given pointer may be implemented in any one of a number of techniques. In some examples, x86-64 code defines certain bits as needing to all have a single value to pass canonicality checks. By flipping one of those bits (e.g., bit 63), existing canonicality checks can be relied on to block accesses to poisoned pointers. For examples using 32-bit pointers, element types that are aligned to at least two-byte boundaries can permit the lowest bit to be used as the poison bit. In some examples, the processor circuitry (100 in FIG. 1) or software can zero out that lowest bit when computing the linear address.

In some examples, other element types may still have bounds checked during pointer arithmetic, but would not be able to indicate poison, so these types can be restricted from pointing outside the authorized allocation. Alternatively, in some examples, bounds checks would be performed selectively at dereference time for just element types that do not have poison bit capabilities.

In some examples, poison zones may be defined differently for different memory safety mechanisms. In some examples, a goal of a poison zone is to avoid ambiguity regarding the authorized allocation for every pointer. For example, if a certain amount of metadata or a redzone is defined between every allocation, then a pointer can be permitted to stray into that region for compatibility without being confused with a pointer to valid data following that region.

In some examples, the bounds checking circuitry 104 can tighten and/or otherwise constrain a length of one or more of the exclusion zone(s) to provide more precise bug detection in systems that do not require such a large poison zone for code compatibility. For example, the supported poison zones could be reduced to not exist below authorized allocations and to end one byte past the end of authorized allocations, which would still be compatible with a significant amount of software.

In some examples, a trusted compiler is assumed and the program/code is initially benign but vulnerable. Thus, the compiler can be trusted to correctly supply information during pointer arithmetic about the element size. Additionally, in some examples, the compiler can be trusted to use the element type when subsequently dereferencing the pointer. In other examples, where the compiler is not trusted, bounds checks can still be performed during dereferences.

Returning to FIG. 1, in some examples, the UpdatePtr instruction causes the bounds checking circuitry 104 to perform the following tasks:

A. Determine the authorized bounds for the original pointer 112.
B. Determine whether the updated pointer (e.g., updated pointer address=original pointer 112 address+update distance 114) falls within an exclusion zone for the authorized allocation. If so, generate an exception.
C. Otherwise, determine whether the updated pointer falls within the poison zone for the authorized allocation based on the specified type/element size. If so, then poison the updated pointer placed in the destination operand.
D. Otherwise, clear the poison indicator in the updated pointer if any was set in the original pointer.

Alternatively, in some examples, similar operations can be performed by software using general-purpose instructions to accomplish the UpdatePtr task without utilizing the instruction.

An example of shifting bounds checks from the point of dereference to when pointer arithmetic is performed is illustrated in the following C++ code that reduces overhead and preserves compatibility:

```
struct s {
  int y, z;
};
s *s_obj = new s;
    //Bounds checks on s can be elided for the next two accesses,
    since no pointer arithmetic was performed.
s_obj->y = 6;
s_obj->z = 7;
int *buf = new int[100];
    // buf_ptr ends up pointing just past the end of the allocation,
    which is supported for compatibility without generating an
    exception.
for (int *buf_ptr = buf; buf_ptr < buf + 100; buf_ptr++ /* Bounds
check is performed during this pointer update */) {
    //Instead of performing a bounds check prior to each of the
    following accesses to buf_ptr as would be usual, bounds checks
    are instead performed only while updating buf_ptr above. And
    no bounds checks are performed for accesses to "s_obj"
    because it never has any pointer arithmetic performed on it.
  *buf_ptr = s_obj->y * s_obj->z;
  s_obj->y += *buf_ptr;
}
```

In some examples, the particular form taken by the bounds check depends on the format of the underlying bounds or other metadata/tags. As illustrated above in the code listing example, the bounds checking circuitry 104 performs the bounds check during the pointer update. In some examples, the bounds checking circuitry 104 checks that an access to anywhere within an element of the allocation starting at the new pointer value is within bounds. In the code listing above, the element type of the allocation "buf" is int, and the element type for "s_obj" is "struct s". The allocation "buf" contains 100 elements, whereas "s_obj" contains only a single element. In some examples, the compiler knows the element type because it is expressed as the pointer type. Thus, when the pointer is updated, the bounds checking circuitry 104 checks that the expected element type fits between the new pointer value and the end of the allocation.

In some examples, if the element does not fit within the authorized allocation 108, then the bounds checking circuitry responds differently depending on the address location of the new pointer reference value. Some software requires the ability to temporarily direct a pointer past the end of the allocation, as in the sample code listing above. In some examples, supporting a pointer just past the end of the authorized allocation 108 is adequate. In other examples, further divergence is needed.

In some examples, the instruction decode circuitry 102 includes means for decoding circuitry. In some examples, the bounds checking circuitry 104 includes means for checking bounds. For example, the means for decoding circuitry may be implemented by the example instruction decode circuitry. The means for checking bounds may be implemented by the example bounds checking circuitry 104. In some examples, the instruction decode circuitry 102 and/or the bounds checking circuitry 104 may be implemented by machine executable instructions such as that implemented by at least one or more blocks corresponding to FIGS. 3-8 executed by processor circuitry, which may be implemented by the example processor circuitry 912 of FIG. 9, the example processor circuitry 1000 of FIG. 10, and/or the example Field Programmable Gate Array (FPGA) circuitry 1100 of FIG. 11. In other examples, the instruction decode circuitry 102 and/or the bounds checking circuitry 104 is/are implemented by other hardware logic circuitry, hardware implemented state machines, and/or any other combination of hardware, software, and/or firmware. For example, the instruction decode circuitry 102 and/or the bounds checking circuitry 104 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

While an example manner of implementing the instruction decode circuitry 102 and bounds checking circuitry 104 of FIG. 1 is illustrated in FIGS. 1 and 2, one or more of the elements, processes, and/or devices illustrated in FIGS. 1 and/or 2 may be combined, divided, re-arranged, omitted, eliminated, and/or implemented in any other way. Further, the example instruction decode circuitry 102 and the example bounds checking circuitry 104 may be implemented by hardware alone or by hardware in combination with software and/or firmware. Thus, for example, any of the example instruction decode circuitry 102 and the example bounds checking circuitry 104 could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example instruction decode circuitry 102 and the example bounds checking circuitry 104 of FIG. 1 may include one or more elements, processes, and/or devices in addition to, or instead of, those illustrated in FIGS. 1 and/or 2, and/or may include more than one of any or all of the illustrated elements, processes and devices.

Flowcharts representative of example hardware logic circuitry, machine readable instructions, hardware implemented state machines, and/or any combination thereof for implementing the example instruction decode circuitry 102 and the example bounds checking circuitry 104 of FIGS. 1 and 2 are shown in FIGS. 3-8. The machine readable instructions may be one or more executable programs or portion(s) of an executable program for execution by processor circuitry, such as the processor circuitry 912 shown in the example processor platform 900 discussed below in connection with FIG. 9 and/or the example processor circuitry discussed below in connection with FIGS. 10 and/or 11. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIGS. 3-8, many other methods of implementing the example instruction decode circuitry 102 and the example bounds checking circuitry 104 of FIGS. 1 and/or 2 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 3-8 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 3:
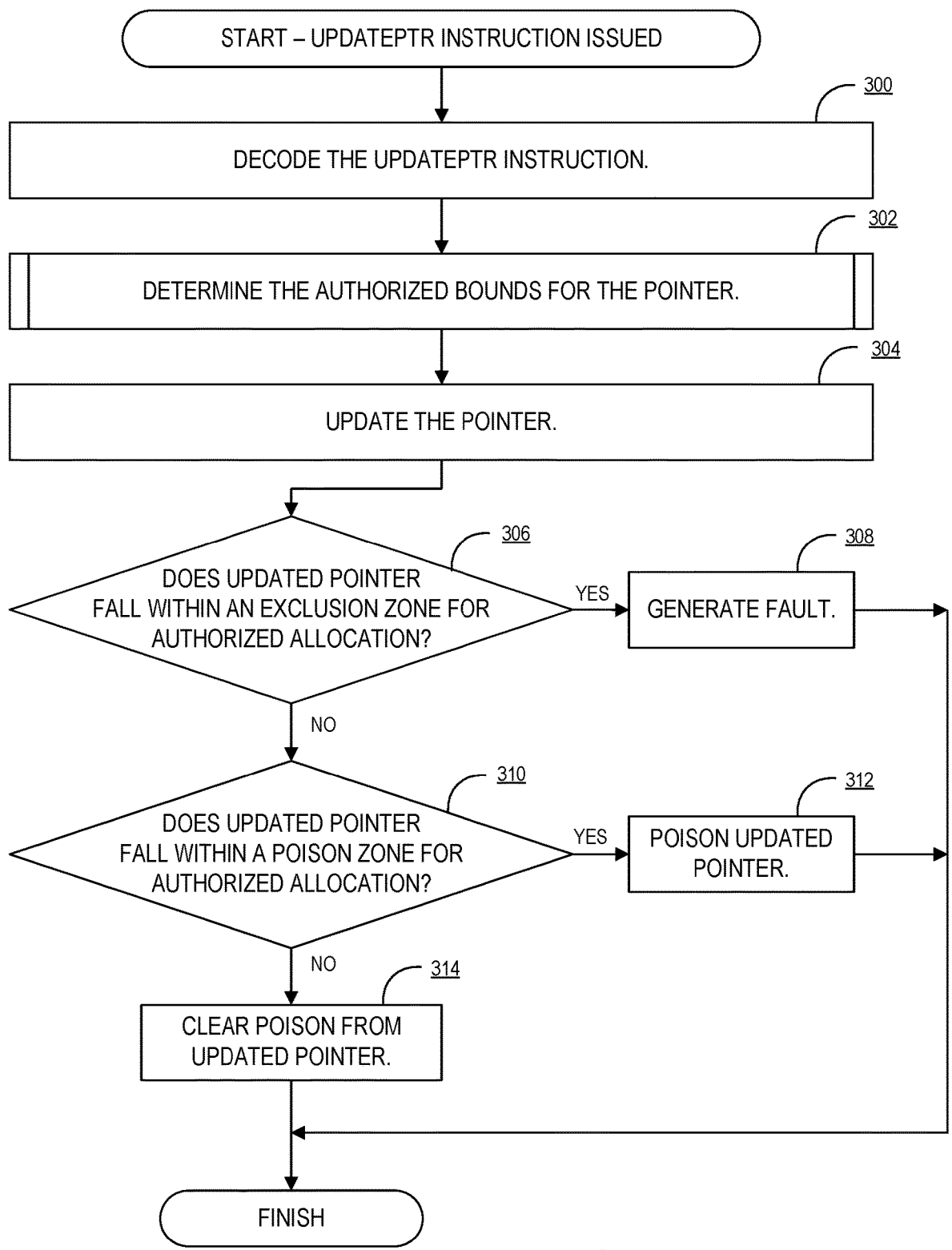
FIG. 3 is a flowchart representative of example machine readable instructions that may be executed by example processor circuitry to implement bounds checking on authorized memory allocations during pointer arithmetic.

FIG. 3 is a flowchart representative of example machine readable instructions that may be executed by example processor circuitry to implement bounds checking on authorized memory allocations during pointer arithmetic. In some examples, the process flow is performed by the instruction decode circuitry (102 in FIG. 1) and the bounds checking circuitry (104 in FIG. 1).

In the illustrated example of FIG. 3, when an UpdatePtr instruction is issued, the process begins. At block 300, the example instruction decode circuitry 102 decodes the issued UpdatePtr instruction. In some examples, the UpdatePtr instruction includes an original pointer operand, an update distance operand, and an element size operand. In other examples, one or more additional operands are included other than the three operands listed. In other examples, the instruction decode circuitry 102 utilizes a set of standard instructions to perform the UpdatePtr process instead of using a specific UpdatePtr instructions.

Figure 4:
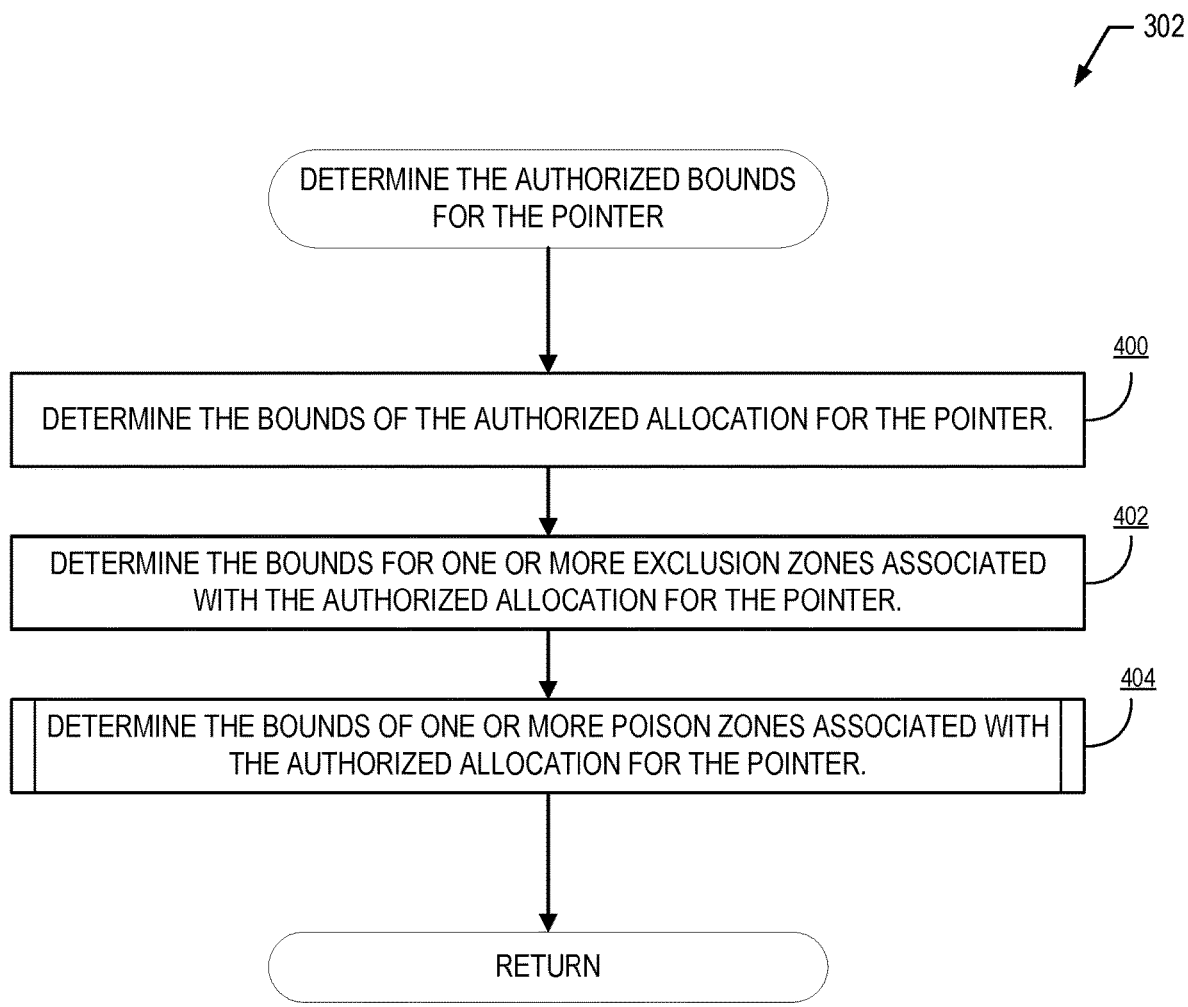
FIG. 4 is a flowchart representative of example machine readable instructions that may be executed by example processor circuitry to determine the authorized bounds of the pointer.

At block 302, the example bounds checking circuitry 104 determines the authorized bounds for the original pointer. In some examples, the "authorized bounds" for the pointer include a determination of the bounds (e.g., memory address range) of the authorized allocation, (e.g., 200 in FIG. 2), a determination of an acceptable dereference address range (e.g., 212 in FIG. 2) within the authorized allocation 200, a determination of one or more poison zones (e.g., 214 and 216 in FIG. 2) outside of the acceptable dereference address range 212, and/or a determination of one or more exclusion zones (e.g., 206 and 208 in FIG. 2) outside of the poison zones 214 and 216. In some examples, the acceptable dereference address range 212, the first and second poison zones 214 and 216, and the lower and upper exclusion zones 206 and 208 are referred to as being "associated" with the authorized allocation 200 because it is in reference to the authorized allocation 200 that these other zones are calculated and exist for use with pointer arithmetic on the pointer. An example process to determine the authorized bounds is described in FIG. 4 (i.e., FIG. 4 illustrates block 302 in more detail).

Returning to the illustrated example of FIG. 3, at block 304, the example bounds checking circuitry 104 updates the original pointer. In some examples, the bounds checking circuitry 104 updates the original pointer by adding the update distance value specified from the update distance operand in the UpdatePtr instruction (see FIG. 1 for detail of the format of the UpdatePtr instruction).

At block 306, the example bounds checking circuitry 104 determines if the updated pointer falls within an exclusion zone for the authorized allocation.

If the updated pointer falls within an exclusion zone for the authorized allocation, then, at block 308, the example bounds checking circuitry 104 generates a fault (e.g., a memory fault/exception) in response to the updated pointer being located in an exclusion zone.

If the updated pointer does not fall within an exclusion zone for the authorized allocation, then, at block 310, the example bounds checking circuitry 104 determines if the updated pointer falls within a poison zone for the authorized allocation.

If the updated pointer falls within a poison zone for the authorized allocation, then, at block 312, the example bounds checking circuitry 104 poisons (e.g., sets the poison flag for the pointer) the updated pointer in response to the updated pointer falling within a poison zone.

If the updated pointer does not fall within a poison zone for the authorized allocation, then, at block 314, the example bounds checking circuitry 104 clears the poison from the updated pointer (e.g., clears the poison flag for the pointer) and the process in FIG. 3 is completed.

FIG. 4 is a flowchart representative of example machine readable instructions that may be executed by example processor circuitry to determine the authorized bounds of the pointer. In some examples, the process flow is performed by the bounds checking circuitry (104 in FIG. 1).

Within block 302 in the example process illustrated in FIG. 3, the more detailed process of FIG. 4 begins at block 400. The example bounds checking circuitry 104 determines the bounds of the authorized allocation for the pointer at block 400. In some examples, the bounds are determined through receiving the bounds upon allocation by the memory safety allocation mechanism. In some examples, the bounds are stored in a register or other memory location to be retrieved by the bounds checking circuitry 104 when needed.

In some examples, the bounds of the authorized allocation include a lower bound and an upper bound (e.g., lower and upper memory address locations of the authorized allocation (e.g., 200 in FIG. 2)). There are several ways to allocate an authorized memory range using memory safety techniques (i.e., to create the authorized allocation). In some examples, the allocation method utilized will result in a bounded region (or one or more separate regions if the allocated memory is not contiguous). In some examples, the bounded region will result in a lower and upper bound (or a lower bound and a size) to define the authorized allocation. The example bounds checking circuitry 104 therefore retrieves the bounds of the authorized allocation for use in pointer arithmetic operations.

At block 402, the example bounds checking circuitry 104 determines the bounds for one or more exclusion zones associated with the authorized allocation for the pointer. In some examples, the determination of the exclusion zones are software compatibility dependent. In some examples, the software utilizing the authorized allocation will have certain practices that regularly move pointer addresses outside of the memory safety zone of authorized allocations.

In some examples, software will provide a notification to the bounds checking circuitry 104 to not generate a fault during pointer arithmetic (e.g., updating a pointer) if the pointer address is updated to an address not authorized to be dereferenced. In some examples, the bounds checking circuitry 104 will push exclusion zone address ranges outside of the range that the software is indicating it will have a pointer reference.

At block 404, the example bounds checking circuitry 104 determines the bounds for one or more poison zones associated with the authorized allocation for the pointer. In some examples, the poison zones are designated to be memory address ranges within the range the software is indicating it requires for compatibility, but outside of the range of the acceptable dereference address range (212 in FIG. 2). At this point the process in FIG. 4 is complete.

Figure 5:
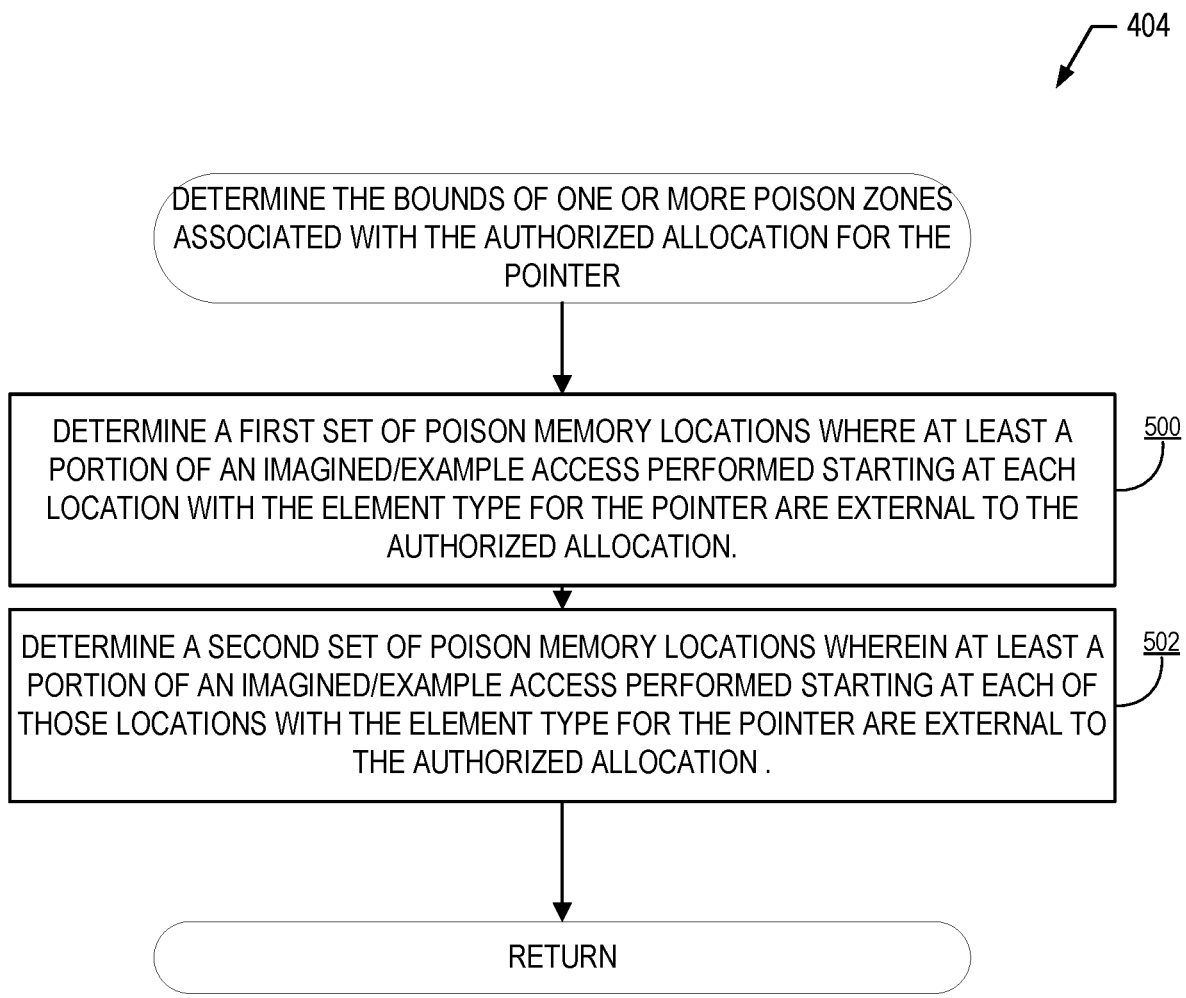
FIG. 5 is a flowchart representative of example machine readable instructions that may be executed by example processor circuitry to determine the bounds of one or more poison zones associated with the authorized allocation for the pointer.

FIG. 5 is a flowchart representative of example machine readable instructions that may be executed by example processor circuitry to determine the bounds of one or more poison zones associated with the authorized allocation for the pointer. In some examples, the process flow is performed by the bounds checking circuitry (104 in FIG. 1).

Within block 404 in the example process illustrated in FIG. 4, the more detailed process of FIG. 5 begins at block 500. The example bounds checking circuitry 104 determines a first set of poison memory locations where at least a portion of an imagined/example access performed starting at each of those locations with the element type for the pointer are external to the authorized allocation at block 500.

At block 502, the example bounds checking circuitry 104 determines a second set of poison memory locations where at least a portion of an imagined/example access performed starting at each of those locations with the element type for the pointer are external to the authorized allocation. In some examples, the poison memory locations include software compatibility zones because they are address ranges that software requiring an allocation needs a pointer to reference without generating a fault. At this point the process in FIG. 5 is complete.

In some examples, shifting type checks for pointers to pointer arithmetic operations instead of during a pointer dereference also may reduce overhead. For example, it may be rarer for some software programs to typecast pointers than it is for programs to dereference such pointers. In those programs, it may be advantageous to perform type-safety checks only when a typecast occurs rather than each time a pointer is dereferenced. In some examples, type-safety checks can be performed in a variety of ways mirroring the variety of bounds checks based on where memory safety metadata is stored. A TypeChk instruction could be defined that accepts a pointer and an expected type ID as input operands and generates an exception if there is a type mismatch. A TypeJmp instruction could be defined that accepts a pointer, an expected type ID, and a jump target as input operands and jumps to the specified jump target if the types match, otherwise executing the next instruction. A series of TypeJmp instructions can be placed one after the other specifying some expected types and specifying a jump target just past a TypeChk instruction that specifies the final possible expected type.

Figure 6:
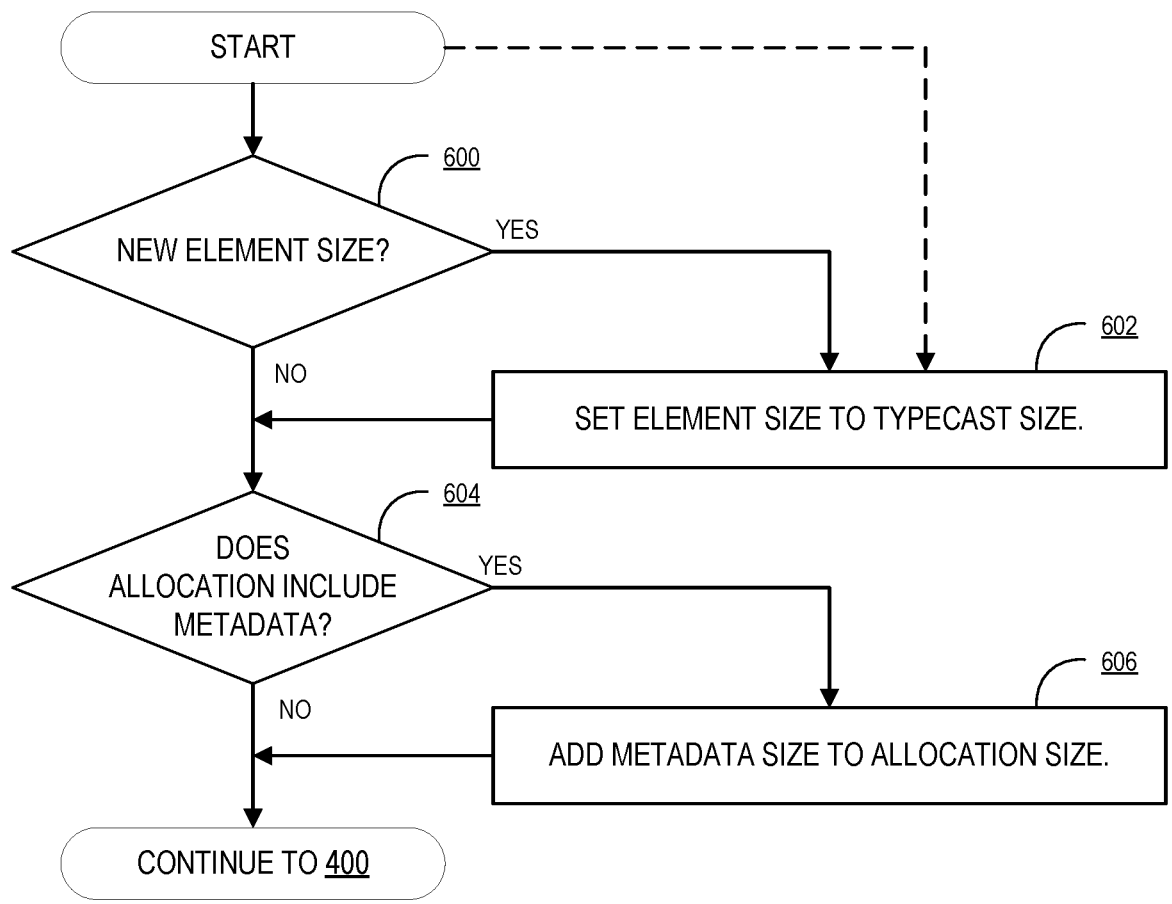
FIG. 6 is a flowchart representative of example machine readable instructions that may be executed by example processor circuitry to check typecasting and metadata inclusion with a pointer.

FIG. 6 is a flowchart representative of example machine readable instructions that may be executed by example processor circuitry to check typecasting and metadata inclusion with a pointer. In some examples, the process flow is performed by the bounds checking circuitry (104 in FIG. 1).

In some examples, at least a portion of the process in FIG. 6 is inserted into the process flow of FIG. 4 within block 302 and just in front of block 400. Thus, in this location in the FIG. 4 process flow, the FIG. 6 process starts at block 600 by the example bounds checking circuitry 104 determining if the pointer is typecast.

If the pointer is typecast, then at block 602 the example bounds checking circuitry 104 sets the element size to the typecast size in response to the pointer being typecast. In some examples, the illustrated example of FIG. 6 does not determine a new element size of block 600, but instead begins at block 602, in which an UpdatePtr unconditionally uses the element size operand passed to it regardless of whether the UpdatePtr instruction was inserted due to a typecast (see dashed arrow). In some examples, the compiler is able to react and insert an UpdatePtr instruction to specify a new element size for the new type applied to the pointer, thereby facilitating and/or otherwise instantiating appropriate bounds checks for the new type. This may result in the bounds checking circuitry 104 increasing the element size relative to past invocations of UpdatePtr for that allocation because the new type of the pointer is a larger size than the current element size. In other examples, the bounds checking circuitry 104 decreases the element size because the new type of the pointer is a smaller size than the current element size. In other cases when a typecast has not just been performed, an identical element size to that used in the most recent invocation of UpdatePtr for that allocation may be used again.

Next, at block 604, the example bounds checking circuitry 104 determines if the allocation includes metadata. If the allocation does include metadata, then in some examples, at block 606, bounds checking circuitry 104 adds the metadata size to the allocation size, if this is necessary. In some examples, the metadata (e.g., tags, etc.) is included in a portion of bits in an allocation (e.g., if room exists in the allocation based on the size of the allocation data). In other examples, the metadata is included with the allocation, but is not located in (e.g., as part of) the allocation data, but rather is attached to the allocation externally (e.g., either in front of or behind the allocation data). In either way, the metadata is "included" with the allocation, but only when the metadata is located outside of the basic allocation data does the bounds checking circuitry 104 require additional space between each allocation. Thus, in some examples where the metadata is included within the allocation, the metadata size does not need to be added to the allocation size. Metadata located outside of the allocation data may be placed within a poison zone or exclusion zone to block software corruption of metadata. Metadata located inline with the allocation data may be protected in other ways, e.g. by encrypting it or marking it with a tag bit as unmodifiable by ordinary data accesses.

Once block 606 has completed, or if block 604 determines there is no metadata with the pointer, then the process in FIG. 6 is completed and returns to block 400 in FIG. 4.

In some examples, when a pointer is cast to a more specific type, it may require an additional bounds check, even if previous bounds checks succeeded for a parent type. Specifically, the more specific type may be larger than the parent type.

In some examples, when a pointer is initialized with an address that is not known a priori to point to adequately large and correctly typed memory, then bounds and/or type checks may be needed at that time.

In some examples, certain transient execution hardening approaches are accelerated by shifting hardening instructions to follow the less frequent bounds checks during pointer arithmetic instead of during dereferences. For example, the LFENCE instruction to harden against a bounds-check bypass may be placed after the UpdatePtr instruction or equivalent software checks.

Performing deterministic bounds checking has an added benefit for tagging approaches in that it removes tradeoffs between enforcing memory safety in transient execution and blocking probes of tag values for out-of-bounds memory regions In some examples, larger poison zones can be provided for software compatibility by including a counter within the pointer that indicates how far the pointer is beyond the end of its authorized allocation. In some examples, this distance may be expressed in terms of bytes or in terms of some alternate (e.g., larger) granularity or in terms relative to some other size that can be determined from the pointer. For example, LEVI pointers specify a power-of-two slot size, so the counter could specify the distance in terms of the number of slots. In some examples, this works for other mechanisms that place allocations in uniformly sized slots (e.g. PartitionAlloc in the Chrome browser).

Figure 7:
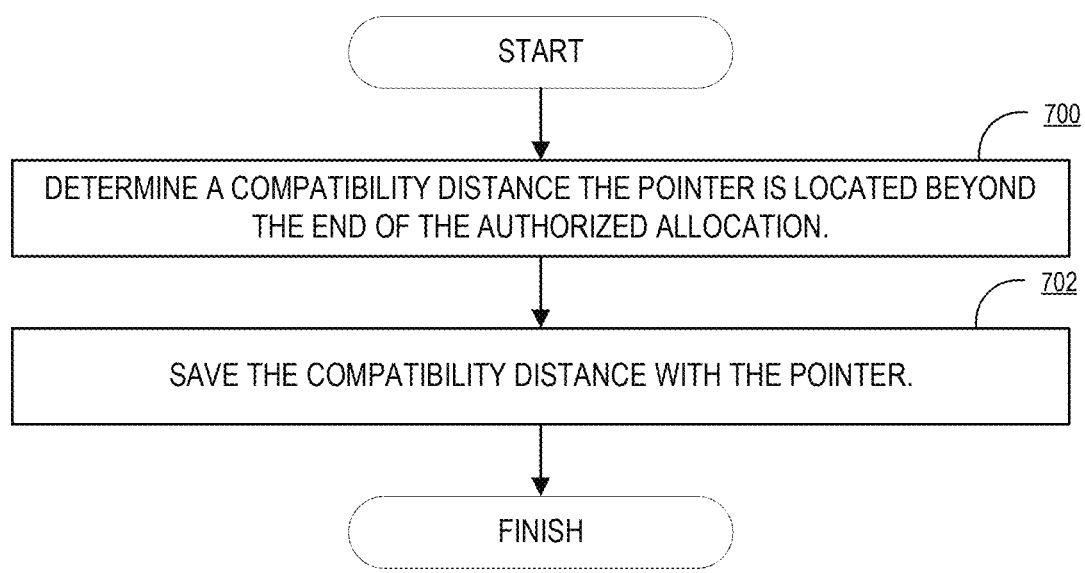
FIG. 7 is a flowchart representative of example machine readable instructions that may be executed by example processor circuitry to implement a compatibility distance counter in a pointer.

FIG. 7 is a flowchart representative of example machine readable instructions that may be executed by example processor circuitry to implement a compatibility distance counter in a pointer. In some examples, the process flow is performed by the bounds checking circuitry (104 in FIG. 1).

At block 700, the process begins with the example bounds checking circuitry 104 determining a compatibility distance the pointer is located beyond the end of the authorized allocation. In some examples, the compatibility distance is a value that when added to the pointer creates a new pointer value that is located within a poison zone or is located within an acceptable dereference zone.

Next, at block 702, the example bounds checking circuitry 104 saves the compatibility distance with the pointer. In some examples, saving the compatibility distance includes saving the compatibility distance in a set of bits within the pointer designated to be used for counter purposes. As mentioned above, the counter may designate a number of bytes beyond the end of the authorized allocation or a different size that is larger than a byte (e.g., a thousand bytes, a million bytes, a certain memory page size, etc.). At this point, the process of FIG. 7 is complete.

Figure 8:
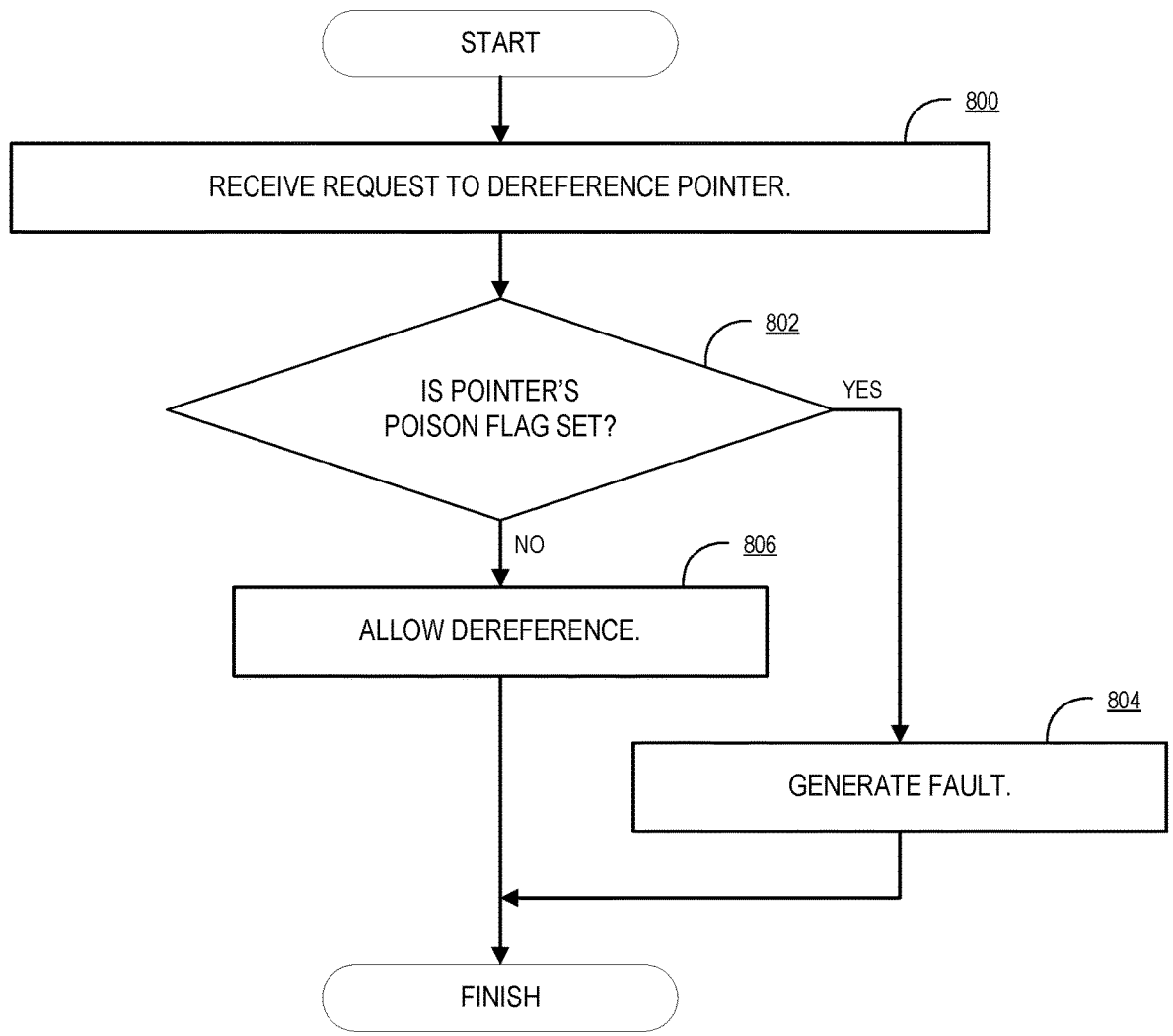
FIG. 8 is a flowchart representative of example machine readable instructions that may be executed by example processor circuitry to implement a poison flag check prior to dereferencing a pointer.

In some examples, bounds checking circuitry 104 acts as a gatekeeper to stop poisoned pointers from being dereferenced. In some examples, the bounds checking circuitry utilizes a process to generate memory faults when poisoned pointers have dereference attempts. FIG. 8 is a flowchart representative of example machine readable instructions that may be executed by example processor circuitry to implement a compatibility distance counter in a pointer. In some examples, the process flow is performed by the bounds checking circuitry (104 in FIG. 1).

The process begins at block 800 by the example bounds checking circuitry 104 receiving a request to dereference a pointer associated with the authorized allocation. At block 802, the example bounds checking circuitry 104 determines if the pointer's poison flag is set.

At block 804, if the poison flag is set, then the example bounds checking circuitry 104 generates a fault in response to the set poison flag (e.g., a memory exception). Otherwise the poison flag is not set, then, at block 806 the example bounds checking circuitry 104 allows the dereference and the process is complete.

In some examples, memory safety checks may be incrementally deployed on pointer updates. For example, to preserve compatibility with software that is incompatible with certain checks or that is unavailable for recompilation, incremental deployment can be utilized. In some examples, un-poisoned pointers preserve the original pointer format. In some examples, passing a poisoned pointer to un-instrumented software is compatible as long as the un-instrumented software does not attempt to dereference the pointer. In some examples, un-instrumented software legitimately needing to un-poison a pointer and access it is uncommon. In some examples, support for such uncommon cases can be implemented by manually un-poisoning the pointer at the interface to the un-instrumented code.

In some examples, the bounds checking circuitry 104 can be implemented in software debugging. For example, the bounds checking circuitry 104 may detect pointers that go far out-of-bounds immediately without waiting for a dereference to take place.

In some examples, deterministically checking bounds for tagging-based mechanisms may impose substantial overhead if the pointer is moved a large distance, since all of the tags between the old and new pointers may need to be checked. In some examples, to reduce denial-of-service issues, an upper limit is defined on the number of tags that can be checked and an exception can be generated if the distance is larger than that limit.

Figure 9:
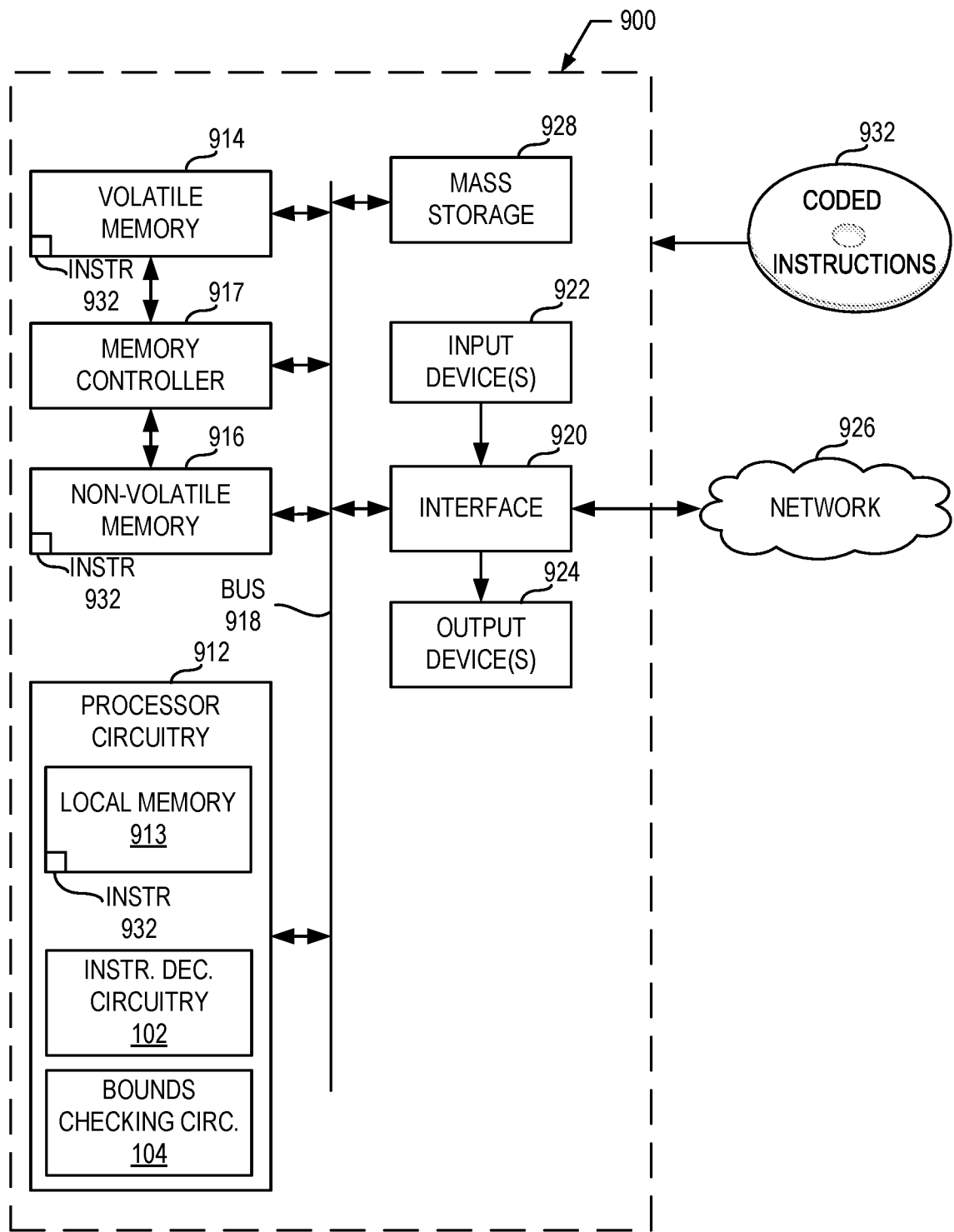
FIG. 9 is a block diagram of an example processing platform including processor circuitry structured to execute the example machine readable instructions of FIGS. 3-8 to implement bounds checking of authorized memory allocations during pointer arithmetic.

FIG. 9 is a block diagram of an example processor platform 900 structured to execute and/or instantiate the machine readable instructions and/or operations of FIGS. 3-8 to implement the apparatus of FIG. 1. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 900 of the illustrated example includes processor circuitry 912. The processor circuitry 912 of the illustrated example is hardware. For example, the processor circuitry 912 can be implemented by one or more integrated circuits, logic circuits, FPGAs microprocessors, CPUs, GPUs, DSPs, and/or microcontrollers from any desired family or manufacturer. The processor circuitry 912 may be implemented by one or more semiconductor based (e.g., silicon based) devices. In this example, the processor circuitry 912 implements the example instruction decode circuitry 102 and the example bounds checking circuitry 104.

The processor circuitry 912 of the illustrated example includes a local memory 913 (e.g., a cache, registers, etc.). The processor circuitry 912 of the illustrated example is in communication with a main memory including a volatile memory 914 and a non-volatile memory 916 by a bus 918. The volatile memory 914 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 916 may be implemented by flash memory and/or any other desired type of memory device. Access to the main memory 914, 916 of the illustrated example is controlled by a memory controller 917.

The processor platform 900 of the illustrated example also includes interface circuitry 920. The interface circuitry 920 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 922 are connected to the interface circuitry 920. The input device(s) 922 permit(s) a user to enter data and/or commands into the processor circuitry 912. The input device(s) 922 can be implemented by, for example, an audio sensor, a microphone, a camera (still or video), a keyboard, a button, a mouse, a touchscreen, a track-pad, a trackball, an isopoint device, and/or a voice recognition system.

One or more output devices 924 are also connected to the interface circuitry 920 of the illustrated example. The output devices 924 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 920 of the illustrated example, thus, typically includes a graphics driver card, a graphics driver chip, and/or graphics processor circuitry such as a GPU.

The interface circuitry 920 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 926. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 900 of the illustrated example also includes one or more mass storage devices 928 to store software and/or data. Examples of such mass storage devices 928 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 932, which may be implemented by the machine readable instructions of FIGS. 3-8, may be stored in the mass storage device 928, in the volatile memory 914, in the non-volatile memory 916, and/or on a removable non-transitory computer readable storage medium such as a CD or DVD.

Figure 10:
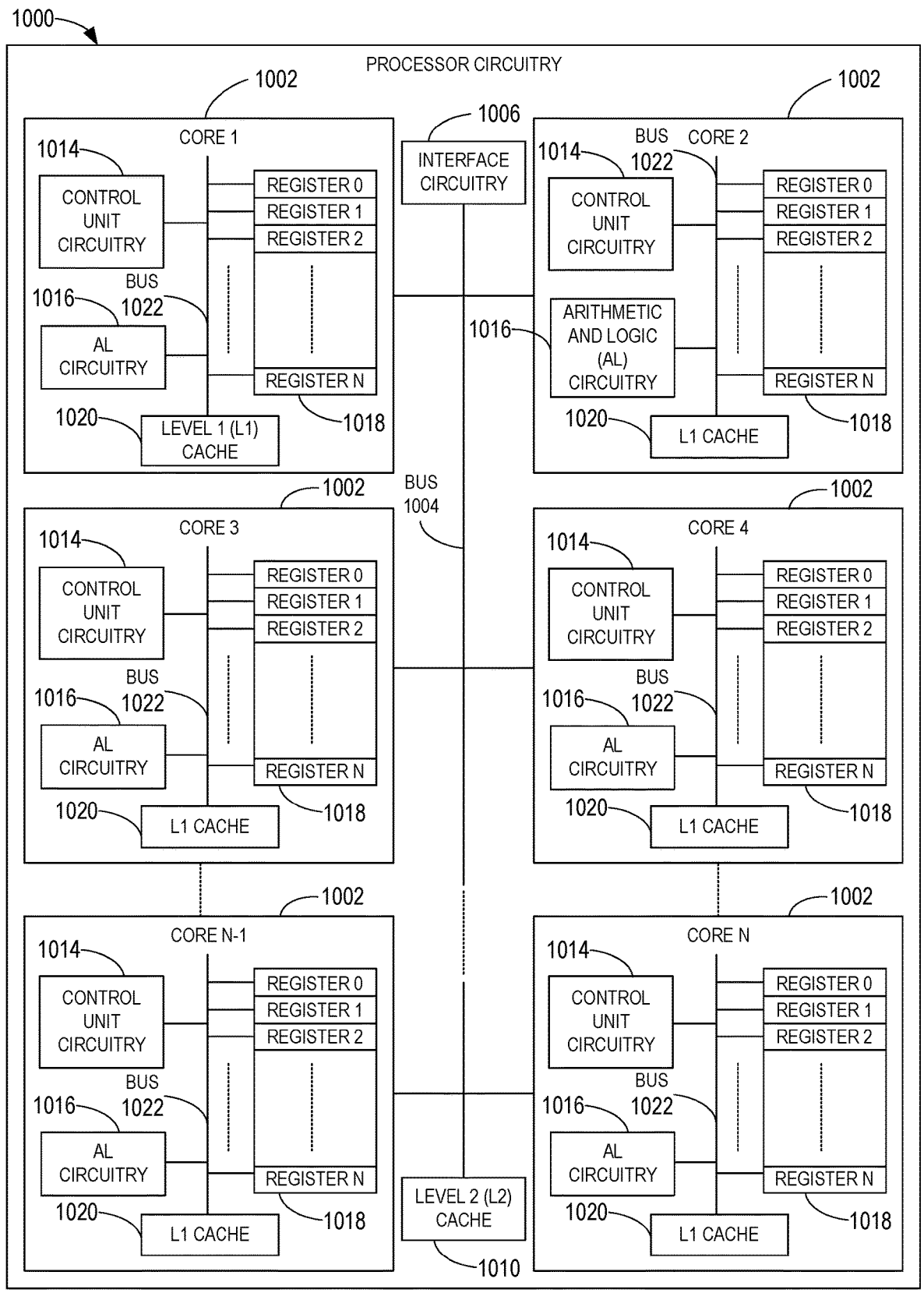
FIG. 10 is a block diagram of an example implementation of the processor circuitry of FIG. 9.

FIG. 10 is a block diagram of an example implementation of the processor circuitry 912 of FIG. 9. In this example, the processor circuitry 912 of FIG. 9 is implemented by a microprocessor 1000. For example, the microprocessor 1000 may implement multi-core hardware circuitry such as a CPU, a DSP, a GPU, an XPU, etc. Although it may include any number of example cores 1002 (e.g., 1 core), the microprocessor 1000 of this example is a multi-core semiconductor device including N cores. The cores 1002 of the microprocessor 1000 may operate independently or may cooperate to execute machine readable instructions. For example, machine code corresponding to a firmware program, an embedded software program, or a software program may be executed by one of the cores 1002 or may be executed by multiple ones of the cores 1002 at the same or different times. In some examples, the machine code corresponding to the firmware program, the embedded software program, or the software program is split into threads and executed in parallel by two or more of the cores 1002. The software program may correspond to a portion or all of the machine readable instructions and/or operations represented by the flowcharts of FIGS. 3-8.

The cores 1002 may communicate by an example bus 1004. In some examples, the bus 1004 may implement a communication bus to effectuate communication associated with one(s) of the cores 1002. For example, the bus 1004 may implement at least one of an Inter-Integrated Circuit (I2C) bus, a Serial Peripheral Interface (SPI) bus, a PCI bus, or a PCIe bus. Additionally or alternatively, the bus 1004 may implement any other type of computing or electrical bus. The cores 1002 may obtain data, instructions, and/or signals from one or more external devices by example interface circuitry 1006. The cores 1002 may output data, instructions, and/or signals to the one or more external devices by the interface circuitry 1006. Although the cores 1002 of this example include example local memory 1020 (e.g., Level 1 (L1) cache that may be split into an L1 data cache and an L1 instruction cache), the microprocessor 1000 also includes example shared memory 1010 that may be shared by the cores (e.g., Level 2 (L2_cache)) for high-speed access to data and/or instructions. Data and/or instructions may be transferred (e.g., shared) by writing to and/or reading from the shared memory 1010. The local memory 1020 of each of the cores 1002 and the shared memory 1010 may be part of a hierarchy of storage devices including multiple levels of cache memory and the main memory (e.g., the main memory 914, 916 of FIG. 9). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1002 may be referred to as a CPU, DSP, GPU, etc., or any other type of hardware circuitry. Each core 1002 includes control unit circuitry 1014, arithmetic and logic (AL) circuitry (sometimes referred to as an ALU) 1016, a plurality of registers 1018, the L1 cache 1020, and an example bus 1022. Other structures may be present. For example, each core 1002 may include vector unit circuitry, single instruction multiple data (SIMD) unit circuitry, load/store unit (LSU) circuitry, branch/jump unit circuitry, floating-point unit (FPU) circuitry, etc. The control unit circuitry 1014 includes semiconductor-based circuits structured to control (e.g., coordinate) data movement within the corresponding core 1002. The AL circuitry 1016 includes semiconductor-based circuits structured to perform one or more mathematic and/or logic operations on the data within the corresponding core 1002. The AL circuitry 1016 of some examples performs integer based operations. In other examples, the AL circuitry 1016 also performs floating point operations. In yet other examples, the AL circuitry 1016 may include first AL circuitry that performs integer based operations and second AL circuitry that performs floating point operations. In some examples, the AL circuitry 1016 may be referred to as an Arithmetic Logic Unit (ALU). The registers 1018 are semiconductor-based structures to store data and/or instructions such as results of one or more of the operations performed by the AL circuitry 1016 of the corresponding core 1002. For example, the registers 1018 may include vector register(s), SIMD register(s), general purpose register(s), flag register(s), segment register(s), machine specific register(s), instruction pointer register(s), control register(s), debug register(s), memory management register(s), machine check register(s), etc. The registers 1018 may be arranged in a bank as shown in FIG. 10. Alternatively, the registers 1018 may be organized in any other arrangement, format, or structure including distributed throughout the core 1002 to shorten access time. The bus 1020 may implement at least one of an I2C bus, a SPI bus, a PCI bus, or a PCIe bus Each core 1002 and/or, more generally, the microprocessor 1000 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1000 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 11:
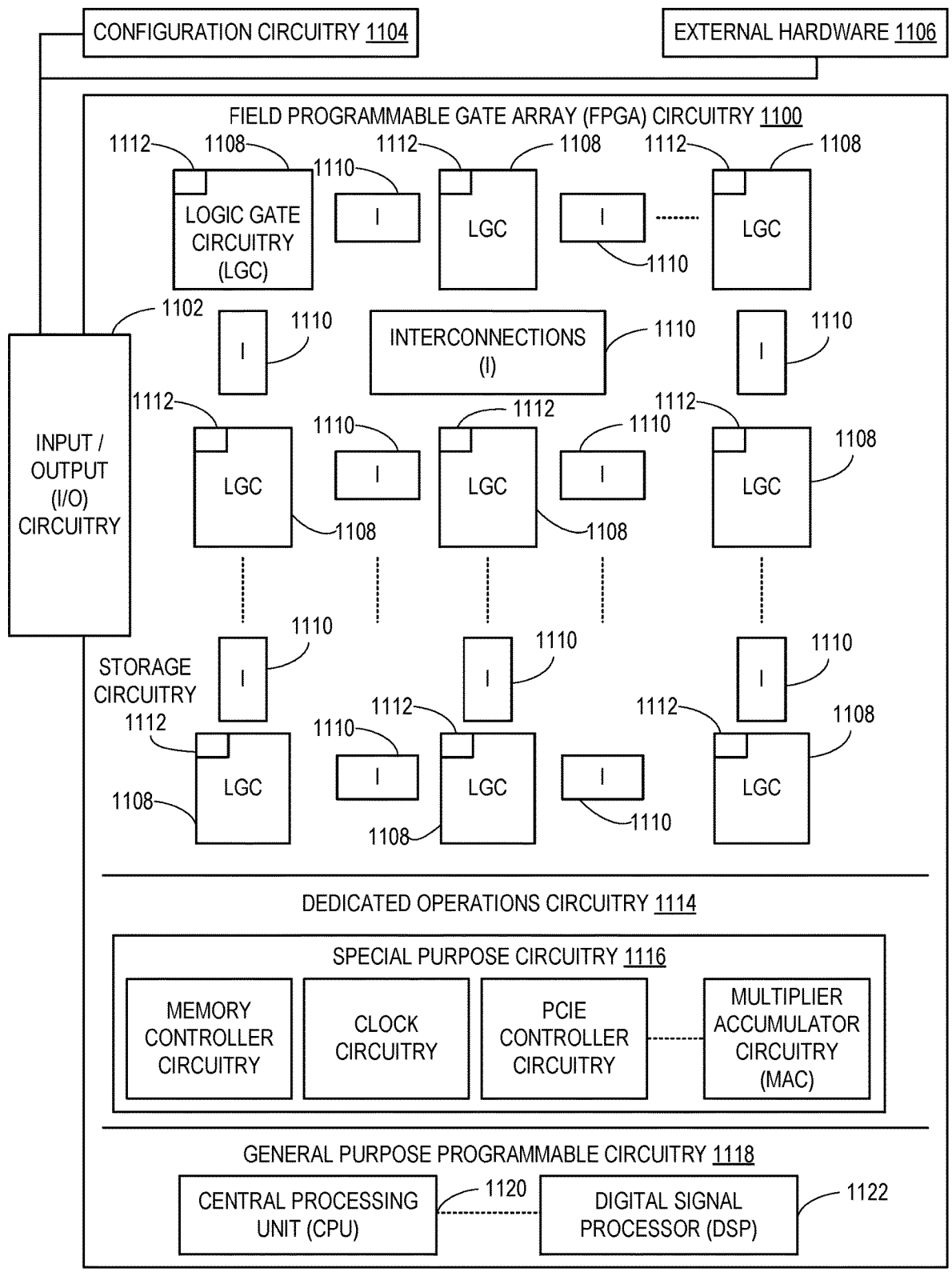
FIG. 11 is a block diagram of another example implementation of the processor circuitry of FIG. 9.

FIG. 11 is a block diagram of another example implementation of the processor circuitry 912 of FIG. 9. In this example, the processor circuitry 912 is implemented by FPGA circuitry 1100. The FPGA circuitry 1100 can be used, for example, to perform operations that could otherwise be performed by the example microprocessor 1000 of FIG. 10 executing corresponding machine readable instructions. However, once configured, the FPGA circuitry 1100 instantiates the machine readable instructions in hardware and, thus, can often execute the operations faster than they could be performed by a general purpose microprocessor executing the corresponding software.

More specifically, in contrast to the microprocessor 1000 of FIG. 10 described above (which is a general purpose device that may be programmed to execute some or all of the machine readable instructions represented by the flowcharts of FIGS. 3-8 but whose interconnections and logic circuitry are fixed once fabricated), the FPGA circuitry 1100 of the example of FIG. 11 includes interconnections and logic circuitry that may be configured and/or interconnected in different ways after fabrication to instantiate, for example, some or all of the machine readable instructions represented by the flowcharts of FIGS. 3-8. In particular, the FPGA 1100 may be thought of as an array of logic gates, interconnections, and switches. The switches can be programmed to change how the logic gates are interconnected by the interconnections, effectively forming one or more dedicated logic circuits (unless and until the FPGA circuitry 1100 is reprogrammed). The configured logic circuits enable the logic gates to cooperate in different ways to perform different operations on data received by input circuitry. Those operations may correspond to some or all of the software represented by the flowcharts of FIGS. 3-8. As such, the FPGA circuitry 1100 may be structured to effectively instantiate some or all of the machine readable instructions of the flowcharts of FIGS. 3-8 as dedicated logic circuits to perform the operations corresponding to those software instructions in a dedicated manner analogous to an ASIC. Therefore, the FPGA circuitry 1100 may perform the operations corresponding to the some or all of the machine readable instructions of FIG. 11 faster than the general purpose microprocessor can execute the same.

In the example of FIG. 11, the FPGA circuitry 1100 is structured to be programmed (and/or reprogrammed one or more times) by an end user by a hardware description language (HDL) such as Verilog. The FPGA circuitry 1100 of FIG. 11, includes example input/output (I/O) circuitry 1102 to obtain and/or output data to/from example configuration circuitry 1104 and/or external hardware (e.g., external hardware circuitry) 1106. For example, the configuration circuitry 1104 may implement interface circuitry that may obtain machine readable instructions to configure the FPGA circuitry 1100, or portion(s) thereof. In some such examples, the configuration circuitry 1104 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1106 may implement the microprocessor 1000 of FIG. 10. The FPGA circuitry 1100 also includes an array of example logic gate circuitry 1108, a plurality of example configurable interconnections 1110, and example storage circuitry 1112. The logic gate circuitry 1108 and interconnections 1110 are configurable to instantiate one or more operations that may correspond to at least some of the machine readable instructions of FIGS. 3-8 and/or other desired operations. The logic gate circuitry 1108 shown in FIG. 11 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1108 to enable configuration of the electrical structures and/or the logic gates to form circuits to perform desired operations. The logic gate circuitry 1108 may include other electrical structures such as look-up tables (LUTs), registers (e.g., flip-flops or latches), multiplexers, etc.

The interconnections 1110 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1108 to program desired logic circuits.

The storage circuitry 1112 of the illustrated example is structured to store result(s) of the one or more of the operations performed by corresponding logic gates. The storage circuitry 1112 may be implemented by registers or the like. In the illustrated example, the storage circuitry 1112 is distributed amongst the logic gate circuitry 1108 to facilitate access and increase execution speed.

The example FPGA circuitry 1100 of FIG. 11 also includes example Dedicated Operations Circuitry 1114. In this example, the Dedicated Operations Circuitry 1114 includes special purpose circuitry 1116 that may be invoked to implement commonly used functions to avoid the need to program those functions in the field. Examples of such special purpose circuitry 1116 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1100 may also include example general purpose programmable circuitry 1118 such as an example CPU 1120 and/or an example DSP 1122. Other general purpose programmable circuitry 1118 may additionally or alternatively be present such as a GPU, an XPU, etc., that can be programmed to perform other operations.

Although FIGS. 10 and 11 illustrate two example implementations of the processor circuitry 912 of FIG. 9, many other approaches are contemplated. For example, as mentioned above, modern FPGA circuitry may include an on-board CPU, such as one or more of the example CPU 1120 of FIG. 11. Therefore, the processor circuitry 912 of FIG. 9 may additionally be implemented by combining the example microprocessor 1000 of FIG. 10 and the example FPGA circuitry 1100 of FIG. 11. In some such hybrid examples, a first portion of the machine readable instructions represented by the flowcharts of FIGS. 3-8 may be executed by one or more of the cores 1002 of FIG. 10 and a second portion of the machine readable instructions represented by the flowcharts of FIGS. 3-8 may be executed by the FPGA circuitry 1100 of FIG. 11.

In some examples, the processor circuitry 912 of FIG. 9 may be in one or more packages. For example, the processor circuitry 1000 of FIG. 10 and/or the FPGA circuitry 1100 of FIG. 11 may be in one or more packages. In some examples, an XPU may be implemented by the processor circuitry 912 of FIG. 9, which may be in one or more packages. For example, the XPU may include a CPU in one package, a DSP in another package, a GPU in yet another package, and an FPGA in still yet another package.

From the foregoing, it will be appreciated that example systems, methods, apparatus, and articles of manufacture have been disclosed that reduce bounds checking overhead by instrumenting pointer arithmetic. The disclosed systems, methods, apparatus, and articles of manufacture improve the efficiency of using a computing device by reducing the overhead of checking the bounds of a memory safety authorized allocation at the time of a common pointer dereference and switches the checking to the time a pointer pointing to the authorized allocation is updated through pointer arithmetic. The disclosed systems, methods, apparatus, and articles of manufacture are accordingly directed to one or more improvement(s) in the operation of a machine such as a computer or other electronic and/or mechanical device.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent. Further examples and combinations thereof include the following:

Example methods, computer-readable medium, and method for reducing bounds checking overhead by instrumenting pointer arithmetic are disclosed herein. Further examples and combinations thereof include the following:

Example 1 includes an apparatus comprising processor circuitry including one or more of at least one of a central processing unit, a graphic processing unit or a digital signal processor, the at least one of the central processing unit, the graphic processing unit or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or an Application Specific Integrate Circuitry (ASIC) including logic gate circuitry to perform one or more third operations, the processor circuitry to perform at least one of the one or more first operations, the one or more second operations or the one or more third operations to, in response to detecting an update pointer instruction, instantiate instruction decode circuitry to decode the update pointer instruction, the update pointer instruction to include at least a pointer operand to specify a pointer pointing to a first memory location in a memory, an update distance operand to specify an update distance to indicate how far to move the pointer from the first memory location, and an element size operand to specify an element size of an element of data to be stored in the memory, and bounds checking circuitry to determine an authorized allocation of the memory for the pointer, modify the pointer to point to a second memory location in the memory, determine at least one poison zone associated with the authorized allocation, and set a poison flag for the pointer in response to the second memory location being located in one of the at least one poison zone.

Example 2 includes the apparatus of example 1, wherein to determine the at least one poison zone associated with the authorized allocation includes the bounds checking circuitry to determine a first set of poison memory locations associated with the authorized allocation, wherein at least a portion of an element of data of the element size stored at any one of the first set of poison memory locations is external to the authorized allocation.

Example 3 includes the apparatus of example 2, wherein to determine the at least one poison zone associated with the authorized allocation further includes the bounds checking circuitry to determine a second set of poison memory locations associated with the authorized allocation wherein at least a portion of the element of data of the element size stored external to the authorized allocation is stored within at least one software compatibility zone.

Example 4 includes the apparatus of example 3, wherein the bounds checking circuitry is to determine at least one exclusion zone associated with the authorized allocation, and determine a set of exclusion zone memory locations associated with the authorized allocation, at least a portion of an element of data stored at any one of the exclusion zone memory locations is external to the authorized allocation and not in the first or second sets of poison memory locations.

Example 5 includes the apparatus of example 4, wherein the bounds checking circuitry is to clear the poison flag in response to the second memory location not being located in either the at least one poison zone or in the at least one exclusion zone.

Example 6 includes the apparatus of example 4, wherein the bounds checking circuitry is to generate a fault in response to at least one of the second memory location being dereferenced when the poison flag is set or the second memory location being located in at least one exclusion zone.

Example 7 includes the apparatus of example 4, wherein the bounds checking circuitry is to update the element size in response to an alternate element size being specified.

Example 8 includes the apparatus of example 3, wherein the bounds checking circuitry is to determine a compatibility distance of the second memory location beyond an end of the authorized allocation in response to the second memory location being in the second set of poison memory locations, and save the compatibility distance with the pointer.

Example 9 includes the apparatus of example 1, wherein the bounds checking circuitry is to add an amount of metadata to the allocation size in the determination of the one or more poison zones and the one or more exclusion zones, wherein the metadata is a size of an amount of metadata included with a given data element.

Example 10 includes the apparatus of example 1, wherein the bounds checking circuitry is to, when modifying the pointer, add the update distance to the pointer.

Example 11 includes a non-transitory computer-readable storage medium comprising instructions that, when executed, cause one or more processors of a machine to at least decode an update pointer instruction, the update pointer instruction to include at least a pointer operand to specify a pointer pointing to a first memory location in a memory, a update distance operand to specify an update distance to indicate how far to move the pointer from the first memory location, and an element size operand to specify an element size of an element of data to be stored in the memory, determine an authorized allocation of the memory for the pointer, modify the pointer to point to a second memory location in the memory, determine one or more poison zones associated with the authorized allocation, and set a poison flag for the pointer in response to the second memory location being located in one of the one or more poison zones.

Example 12 includes the non-transitory computer-readable storage medium of example 11, wherein the instructions, when executed, cause the one or more processors of the machine to at least determine a first set of poison memory locations associated with the authorized allocation wherein at least a portion of an element of data of the element size stored at any one of the first set of poison memory locations is external to the authorized allocation.

Example 13 includes the non-transitory computer-readable storage medium of example 12, wherein the instructions, when executed, cause the one or more processors of the machine to at least determine a second set of poison memory locations associated with the authorized allocation wherein all portions of the element of data of the element size stored external to the authorized allocation are stored in at least one software compatibility zone.

Example 14 includes the non-transitory computer-readable storage medium of example 13, wherein the instructions, when executed, cause the one or more processors of the machine to at least determine a set of exclusion zone memory locations associated with the authorized allocation, at least a portion of a given element of data stored at any one of the exclusion zone memory locations is external to the authorized allocation and not in the first or second sets of poison memory locations.

Example 15 includes the non-transitory computer-readable storage medium of example 14, wherein the instructions, when executed, cause the one or more processors of the machine to at least clear the poison flag in response to the second memory location not being located in either the one or more poison zones or in the one or more exclusion zones.

Example 16 includes the non-transitory computer-readable storage medium of example 14, wherein the instructions, when executed, cause the one or more processors of the machine to at least generate a fault in response to at least one of the second memory location being dereferenced when the poison flag is set or the second memory location being located in at least one exclusion zone.

Example 17 includes the non-transitory computer-readable storage medium of example 14, wherein the instructions, when executed, cause the one or more processors of the machine to at least update the element size in response to an alternate element size being specified.

Example 18 includes the non-transitory computer-readable storage medium of example 13, wherein the instructions, when executed, cause the one or more processors of the machine to at least determine a compatibility distance of the second memory location beyond an end of the authorized allocation in response to the second memory location being in the second set of poison memory locations, and save the compatibility distance with the pointer.

Example 19 includes the non-transitory computer-readable storage medium of example 11, wherein the instructions, when executed, cause the one or more processors of the machine to at least add an amount of metadata size to the element size in the determination of the one or more poison zones and the one or more exclusion zones, wherein the metadata size is a size of an amount of metadata included with a given data element.

Example 20 includes the non-transitory computer-readable storage medium of example 11, wherein the instructions, when executed, cause the one or more processors of the machine to at least modify the pointer by adding the update distance to the pointer.

Example 21 includes an apparatus comprising instruction decode circuitry to detect an update pointer instruction, and decode the update pointer instruction to extract a first memory location and a second memory location, and bounds checking circuitry to determine an authorized allocation of a memory for a pointer, the pointer to point to the first memory location in the memory, modify the pointer to point to the second memory location in the memory, determine one or more poison zones associated with the authorized allocation, set a poison flag for the pointer in response to the second memory location being located in one of the one or more poison zones.

Example 22 includes the apparatus of example 21, wherein to determine one or more poison zones associated with the authorized allocation includes the bounds checking circuitry to determine a first set of poison memory locations associated with the authorized allocation wherein at least a portion of an element of data of an element size stored at any one of the first set of poison memory locations is external to the authorized allocation, and determine a second set of poison memory locations associated with the authorized allocation wherein at least a portion of the element of data of the element size stored external to the authorized allocation is stored in at least one software compatibility zone.

Example 23 includes the apparatus of example 22, wherein to determine one or more exclusion zones associated with the authorized allocation further includes the bounds checking circuitry to determine a set of exclusion zone memory locations associated with the authorized allocation, at least a portion of a given element of data stored at any one of the exclusion zone memory locations is external to the authorized allocation and not in the first or second sets of poison memory locations.

Example 24 includes the apparatus of example 23, wherein the bounds checking circuitry is to clear the poison flag in response to the second memory location not being located in either the one or more poison zones or in the one or more exclusion zones.

Example 25 includes the apparatus of example 23, wherein the bounds checking circuitry is to generate a fault in response to at least one of the second memory location being dereferenced when the poison flag is set or the second memory location being located in at least one exclusion zone.

Example 26 includes the apparatus of example 23, wherein the bounds checking circuitry is to update the element size in response to an alternate element size being specified.

Example 27 includes the apparatus of example 22, wherein the bounds checking circuitry is to determine a compatibility distance of the second memory location beyond an end of the authorized allocation in response to the second memory location being in the second set of poison memory locations, and save the compatibility distance with the pointer.

Example 28 includes the apparatus of example 21, wherein the bounds checking circuitry is to add an amount of metadata size to an allocation size in the determination of the one or more poison zones and the one or more exclusion zones, wherein the metadata size is a size of an amount of metadata included with a given data element.

Example 29 includes the apparatus of example 21, wherein the bounds checking circuitry is to, when modifying the pointer, add the update distance to the pointer.

Example 30 includes a system to reduce bounds checking overhead, the system comprising means for decoding circuitry to decode an update pointer instruction, the decoding to extract a pointer operand to specify a pointer pointing to a first memory location in a memory, an update distance operand to specify an update distance to indicate how far to move the pointer from the first memory location, and an element size operand to specify an element size of an element of data to be stored in the memory, and means for checking bounds to determine an authorized allocation of the memory for the pointer, add the update distance to the pointer to modify the pointer to point to a second memory location in the memory, determine at least one exclusion zone associated with the authorized allocation, generate a fault in response to the second memory location being located in one of the at least one exclusion zone, determine at least one poison zone associated with the authorized allocation, and set a poison flag for the pointer in response to the second memory location being located in one of the at least one poison zone.

The following claims are hereby incorporated into this Detailed Description by this reference, with each claim standing on its own as a separate embodiment of the present disclosure.

What is claimed is:

1. An apparatus comprising:
   interface circuitry;
   machine-readable instructions; and
   programmable circuitry to be programmed by the machine-readable instructions to:
     decode an update pointer instruction, the update pointer instruction to include at least a pointer operand to specify a pointer pointing to a first memory location in a memory, an update distance operand to specify an update distance to indicate how far to move the pointer from the first memory location, and an element size operand to specify an element size of an element of data to be stored in the memory;
     determine an authorized allocation of the memory for the pointer;
     modify the pointer to point to a second memory location in the memory;
     determine at least one poison zone associated with the authorized allocation by adding a metadata size to the element size, the metadata size corresponding to an amount of metadata included with a given data element; and
     set a poison flag for the pointer in response to the second memory location being located in one of the at least one poison zone.

2. The apparatus of claim 1, wherein to determine the at least one poison zone associated with the authorized allocation includes the programmable circuitry to determine a first set of poison memory locations associated with the authorized allocation, wherein at least a portion of an element of data of the element size stored at any one of the first set of poison memory locations is external to the authorized allocation.

3. The apparatus of claim 2, wherein to determine the at least one poison zone associated with the authorized allocation further includes the programmable circuitry to determine a second set of poison memory locations associated with the authorized allocation wherein at least a portion of the element of data of the element size stored external to the authorized allocation is stored within at least one software compatibility zone.

4. The apparatus of claim 3, wherein the programmable circuitry is to:
  determine at least one exclusion zone associated with the authorized allocation; and
  determine a set of exclusion zone memory locations associated with the authorized allocation, at least a portion of an element of data stored at any one of the exclusion zone memory locations is external to the authorized allocation and not in the first or second sets of poison memory locations.

5. The apparatus of claim 4, wherein the programmable circuitry is to clear the poison flag in response to the second memory location not being located in either the at least one poison zone or in the at least one exclusion zone.

6. The apparatus of claim 1, wherein the programmable circuitry is to, when modifying the pointer, add the update distance to the pointer.

7. A non-transitory computer-readable storage medium comprising instructions that, when executed, cause one or more processors of a machine to at least:
  decode an update pointer instruction, the update pointer instruction to include at least a pointer operand to specify a pointer pointing to a first memory location in a memory, an update distance operand to specify an update distance to indicate how far to move the pointer from the first memory location, and an element size operand to specify an element size of an element of data to be stored in the memory;
  determine an authorized allocation of the memory for the pointer;
  modify the pointer to point to a second memory location in the memory;
  determine one or more poison zones associated with the authorized allocation by adding a metadata size to the element size, the metadata size corresponding to an amount of metadata included with a given data element; and
  set a poison flag for the pointer in response to the second memory location being located in one of the one or more poison zones.

8. The non-transitory computer-readable storage medium of claim 7, wherein the instructions, when executed, cause the one or more processors of the machine to at least determine a first set of poison memory locations associated with the authorized allocation wherein at least a portion of an element of data of the element size stored at any one of the first set of poison memory locations is external to the authorized allocation.

9. The non-transitory computer-readable storage medium of claim 8, wherein the instructions, when executed, cause the one or more processors of the machine to at least determine a second set of poison memory locations associated with the authorized allocation wherein all portions of the element of data of the element size stored external to the authorized allocation are stored in at least one software compatibility zone.

10. The non-transitory computer-readable storage medium of claim 9, wherein the instructions, when executed, cause the one or more processors of the machine to at least determine one or more exclusion zones that are memory locations associated with the authorized allocation, at least a portion of a given element of data stored at any one of the one or more exclusion zones is external to the authorized allocation and not in the first or second sets of poison memory locations.

11. The non-transitory computer-readable storage medium of claim 10, wherein the instructions, when executed, cause the one or more processors of the machine to at least clear the poison flag in response to the second memory location not being located in either the one or more poison zones or in the one or more exclusion zones.

12. The non-transitory computer-readable storage medium of claim 10, wherein the instructions, when executed, cause the one or more processors of the machine to at least generate a fault in response to at least one of the second memory location being dereferenced when the poison flag is set or the second memory location being located in at least one exclusion zone.

13. The non-transitory computer-readable storage medium of claim 10, wherein the instructions, when executed, cause the one or more processors of the machine to at least update the element size in response to an alternate element size being specified.

14. The non-transitory computer-readable storage medium of claim 9, wherein the instructions, when executed, cause the one or more processors of the machine to at least:
  determine a compatibility distance of the second memory location beyond an end of the authorized allocation in response to the second memory location being in the second set of poison memory locations; and
  save the compatibility distance with the pointer.

15. The non-transitory computer-readable storage medium of claim 10, wherein the instructions, when executed, cause the one or more processors of the machine to at least add the metadata size to the element size in the determination of the one or more exclusion zones.

16. The non-transitory computer-readable storage medium of claim 7, wherein the instructions, when executed, cause the one or more processors of the machine to at least modify the pointer by adding the update distance to the pointer.

17. An apparatus comprising
  instruction decode circuitry to:
    decode an update pointer instruction, the update pointer instruction to include at least a pointer operand to specify a pointer pointing to a first memory location in memory, an update distance operand to specify an update distance to indicate how far to move the pointer from the first memory location, and an element size operand to specify an element size of an element of data to be stored in the memory; and
  bounds checking circuitry to:
    determine an authorized allocation of the memory for the pointer;
    modify the pointer to point to a second memory location in the memory;
    determine one or more poison zones associated with the authorized allocation by adding a metadata size to the element size, the metadata size corresponding to an amount of metadata included with a given data element; and
    set a poison flag for the pointer in response to the second memory location being located in one of the one or more poison zones.

18. The apparatus of claim 17, wherein to determine the one or more poison zones associated with the authorized allocation includes the bounds checking circuitry to:

determine a first set of poison memory locations associated with the authorized allocation wherein at least a portion of an element of data of the element size stored at any one of the first set of poison memory locations is external to the authorized allocation; and determine a second set of poison memory locations associated with the authorized allocation wherein at least a portion of the element of data of the element size stored external to the authorized allocation is stored in at least one software compatibility zone.

19. The apparatus of claim 18, wherein to determine one or more exclusion zones associated with the authorized allocation further includes the bounds checking circuitry to determine a set of exclusion zone memory locations associated with the authorized allocation, at least a portion of a given element of data stored at any one of the exclusion zone memory locations is external to the authorized allocation and not in the first or second sets of poison memory locations.

20. The apparatus of claim 19, wherein the bounds checking circuitry is to clear the poison flag in response to the second memory location not being located in either the one or more poison zones or in the one or more exclusion zone memory locations.

\* \* \* \* \*